United States Patent
Zuo et al.

(10) Patent No.: US 8,582,666 B2
(45) Date of Patent: Nov. 12, 2013

(54) IMAGE COMPRESSION AND DECOMPRESSION

(75) Inventors: Fei Zuo, Eindhoven (NL); Stijn De Waele, Eindhoven (NL); Wilhelmus Hendrikus Alfonsus Bruls, Eindhoven (NL); Karel Johannes Gerhardus Hinnen, Eindhoven (NL); Michael Verberne, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1140 days.

(21) Appl. No.: 12/519,369

(22) PCT Filed: Dec. 11, 2007

(86) PCT No.: PCT/IB2007/055011
§ 371 (c)(1),
(2), (4) Date: Jun. 16, 2009

(87) PCT Pub. No.: WO2008/075247
PCT Pub. Date: Jun. 26, 2008

(65) Prior Publication Data
US 2010/0027686 A1    Feb. 4, 2010

(30) Foreign Application Priority Data

Dec. 18, 2006 (EP) .................................. 06126324

(51) Int. Cl.
*H04N 7/12* (2006.01)
*H04N 11/02* (2006.01)
*H04N 11/04* (2006.01)

(52) U.S. Cl.
USPC ............ 375/240.29; 375/240.24; 375/240.25; 382/233; 382/260; 382/261

(58) Field of Classification Search
USPC ........ 375/240.01–240.29, 355; 382/248, 625, 382/233, 260, 261; 348/625
See application file for complete search history.

(56) References Cited

U.S. PATENT DOCUMENTS

| 5,796,875 | A | | 8/1998 | Read |
| 6,167,164 | A | * | 12/2000 | Lee ............................. 382/261 |

(Continued)

FOREIGN PATENT DOCUMENTS

WO    2005034517 A1    4/2005

OTHER PUBLICATIONS

Choung et al: "A Fast Adaptive Image Restoration Filter for Reducing Block Artifact in Compressed Images"; IEEE Transactions on Consumer Electronics, vol. 43, No. 4, pp. 1340-1346.

(Continued)

*Primary Examiner* — Sath V Perungavoor
*Assistant Examiner* — Nathnael Aynalem

(57) ABSTRACT

Clusters of pixels are defined for use in image compression and decompression. The image information used to define the clusters may include pixel values at predetermined positions relative to a pixel or related motion vectors, gradients, texture etc. During compression of images the image information relative to pixels is examined to determine the cluster to which it belongs. Thus pixels can be classified according to the cluster for their image information. In an embodiment the definitions of the clusters are selected dynamically, dependent on image content. For each cluster a control parameter set is computed for a post-processing operation, such as filter coefficients for filtering or statistical data for locally generating texture. The control parameter set is selected dependent on the image content so that, when the post-processing operation is applied to the image after decompression it will improve image quality for the pixels that are classified as belonging to the cluster. The compressed image and the control parameter sets are transmitted to a decompression apparatus. Upon decompression, the image information that represents the decompressed image is examined to classify pixels according to the clusters and the different control parameter sets for the selected clusters are used to control post-processing at the locations of the pixels.

39 Claims, 18 Drawing Sheets

(56) References Cited

U.S. PATENT DOCUMENTS

| | | | | |
|---|---|---|---|---|
| 6,466,702 | B1* | 10/2002 | Atkins et al. | 382/300 |
| 6,600,517 | B1* | 7/2003 | He et al. | 348/625 |
| 6,823,086 | B1 | 11/2004 | Dolazza | |
| 7,068,722 | B2* | 6/2006 | Wells | 375/240.16 |
| 7,492,848 | B2* | 2/2009 | Gurrapu | 375/355 |
| 7,756,350 | B2* | 7/2010 | Vos et al. | 382/248 |
| 2002/0057740 | A1* | 5/2002 | Yamada | 375/240.12 |
| 2003/0039310 | A1 | 2/2003 | Wu et al. | |
| 2004/0057624 | A1 | 3/2004 | Wells | |
| 2004/0076237 | A1* | 4/2004 | Kadono et al. | 375/240.29 |
| 2007/0140335 | A1* | 6/2007 | Wilinski et al. | 375/240.08 |
| 2008/0112632 | A1* | 5/2008 | Vos et al. | 382/248 |

OTHER PUBLICATIONS

Wittman et al: "SEI Message on Post-Filter Hints"; Joint Video Team (JVT) of ISO/IEC MPEG & ITU-T VCEG (ISO/IEC JTC1/SC29/WG11 and ITU-T SG16 Q.6), Document:JVT-U035, 21st Meeting: Hangzhou, China, Oct. 20-27, 2006, 11 Page Document.

Lai et al: "An Optimal L-Filter for Reducing Blocking Artifacts Using Genetic Algorithms"; Signal Processing 81 (2001), pp. 1525-1535.

List et al: "Adaptive Deblocking Filter"; IEEE Transactions on Circuits and Systems for Video Technology, vol. 13, No. 7, Jul. 2003, pp. 614-619.

* cited by examiner

NE

IMAGE COMPRESSION AND DECOMPRESSION

FIELD OF THE INVENTION

The invention relates to methods and apparatuses for image compression and decompression.

BACKGROUND OF THE INVENTION

Methods of lossy image compression are known, both in the context of video compression and for individual images. The dominant examples are the methods defined in the various MPEG and JPEG compression/decompression standards, which include coarse quantization of image data. These lossy compression methods introduce artefacts, i.e. differences between original images and reconstructed images that are obtained after compression and decompression.

A method of reducing these differences has been described in a publication titled "Post filter SEI message for 4:4:4 coding" by S. Wittmann and T. Wedi, at the 18$^{th}$ meeting of the Joint Video Team (JVT) of ISP/IEC MPEG & ITU-T VCEG (document number JVT S030).

In this publication it is proposed to add messages to an MPEG video stream that define the filter coefficients for a FIR (Finite Impulse Response) post-filter that is to be applied to decoded images on the decoder side in order to reduce compression artefacts. Wiener filtering is used, that is, a statistical measure for the difference between the original image and the post-filtered, decompressed image is defined and the filter coefficients selected so that they minimize the value of this measure. As may be noted, this means that the value of the filter coefficients depends on the content of the image. The filter coefficients are computed in the encoder and included in the video stream. The decoder extracts the coefficients from the stream and applies post-filtering using the extracted coefficients.

Unfortunately, this type of post-filtering only provides a limited reduction of compression artefacts.

SUMMARY OF THE INVENTION

Among others, it is an object to provide for a method of reducing compression artefacts.

A decompression apparatus according to claim 1 is provided. Herein for each of a plurality of pixels in a decompressed image the pixels are classified based on the content of the image in a respective window relative to the pixel. The classification is used to select a control parameter set from a plurality of control parameter sets that have been transmitted with the image. The selected control parameter set is used to control post-processing for the pixels. In this way it is made possible to use different post-processing at different pixels in the image. At pixels where different classes of features are detected, different control parameter sets for post-filtering may be used for example. Similarly where gradients in different directions occur, different control parameter sets for post-filtering may be used.

Within the framework of the invention "post-filtering" and 'post-processing' includes filtering and processing after complete decoding of an image, i.e. after the complete decoding process. Often images are decoded using a loop process wherein after an initial decoding a loop process is performed to obtain a final decoded image. The final decoded image is than filtered out-of-loop. Such 'out-of-loop'-embodiments of the invention form a preferred group of embodiments.

Within the concept of the invention application of in-loop filters is also included, for instance an in-loop application of deblocking filters is also included. The "post-filtering" is then applied in-loop after an initial decoding step. Such "in-loop"-embodiments of the invention also form a preferred group of embodiments.

In embodiment the sets of control parameters are multiplexed into an image stream together with the compressed image. Alternatively, the sets of control parameters and the compressed images may be supplied to a decompression apparatus separately, for example to separate sub-inputs of an input of the decompression apparatus when a user of the decompression apparatus has subscribed to receive an image to apply post-processing.

In an embodiment the post-processing comprises filtering with a filter, for example a finite impulse response filter, with filter coefficients defined by the control parameter set. But alternatively other forms of post-processing may be used, such as local additions of a texture with statistical parameters defined by the control parameter set.

A compression apparatus according to claim 18 is provided. This compression apparatus selects the control parameter sets for different classes and adds them to the compressed image signal. In an embodiment the compression apparatus also selects a class definition dependent on the content of the image and adds it to the compressed image signal. The class definition may comprise for example representative vectors of pixel values in windows of the decompressed image. In an embodiment the plurality control parameter sets are computed in common for a plurality of input images. In this way the control parameter set can be reused for different images. This reduces bandwidth needed for the compressed signal. The control parameter sets may be selected dependent on a difference between the input image and a decompressed image defined by the decompressed image signal, so as to define post-processing operations that define this difference.

BRIEF DESCRIPTION OF THE DRAWINGS

These and other objects and advantageous aspects will become apparent from exemplary embodiments that will be described using the following Figs.

DETAILED DESCRIPTION OF THE EMBODIMENTS

Figure 1:
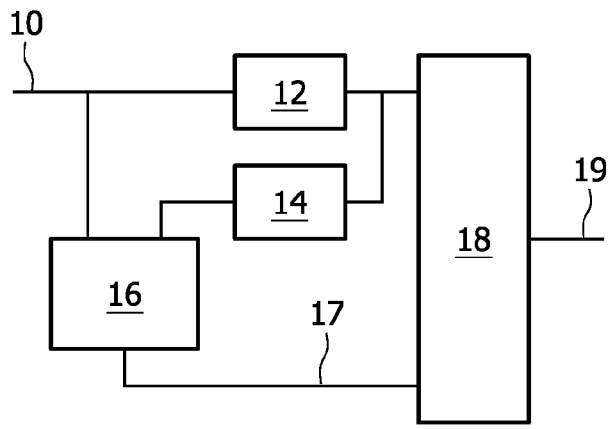
FIG. 1 shows a compression apparatus.

FIG. 1 shows a compression apparatus. The compression apparatus comprises a stream input 10, a compressor 12, a decompressor 14, a parameter estimator 16, a stream multiplexer 18 and a compressed stream output 19. Compressor 12 has an input coupled to stream input 10 and an output coupled to stream multiplexer 18. Decompressor 14 has an input coupled to the output of compressor 12. Parameter estimator 16 has inputs coupled to stream input 10 and to an output of decompressor 14. Parameter estimator 16 has an output coupled to stream multiplexer 18 for providing parameter data 17. Stream multiplexer 18 has an output coupled to compressed stream output 19.

Figure 2:
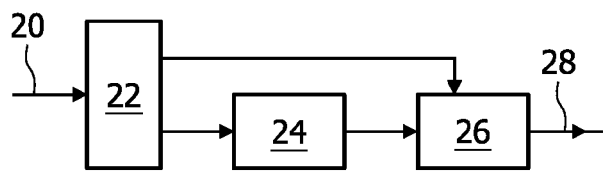
FIG. 2 shows a decompression apparatus.

FIG. 2 shows a decompression apparatus. The decompression apparatus comprises a compressed stream input 20, a stream demultiplexer 22, a decompressor 24, a post-filter 26 and a decompressed output 28. Stream demultiplexer 22 has an input coupled to compressed stream input 20 and outputs coupled to an input of decompressor 24 and a control input of post-filter 26. Post-filter 26 has a signal input coupled to an output of decompressor 24 and an output coupled to compressed stream output.

In both Figs. only components relevant to image compression and decompression have been shown. It should be understood that other components may be present, for example for audio compression and decompression, data management etc. Furthermore it should be appreciated that the different components may be implemented using one or more programmable processing circuits, programmed with a program to make the processing circuit operate as the relevant component. One programmable processing circuit may be used to operate as different ones of the components under control of different programs, or different processing circuits may be used. As an alternative, the components may be implemented using dedicated circuits or as a mixture of programmed and dedicated circuits.

In operation the compression apparatus produces a compressed stream and the compressed stream is applied to the decompression apparatus. Any way of coupling may be used. For example, the compressed stream from the compression apparatus may be broadcast or one to one transmitted via any medium (not shown) and supplied to the decompression apparatus, or it may be stored in a storage device and applied to the decompression apparatus from the storage. Of course any mixture of storage and broadcast or transmission may be used.

Compressor 12 and decompressors 14, 24 perform compression and corresponding decompression of images. Any form of compression and decompression may be used, for example such as defined by any MPEG standard. Stream multiplexer 18 combines compressed image data with any desired other data into a compressed stream. Stream demultiplexer 22 extracts the compressed image data and supplies the extracted data to decompressor 24. Decompressor decompresses the image data and supplies the decompressed image data to post-filter 26. Post filter 26 filters the data and outputs filtered image data, which may be used for example to control a display device (not shown) to render the image on a screen.

Although a multiplexer 18 and a demultiplexer 22 have been shown, so that a compressed image and sets of control parameters for post-processing that image can be combined in one image signal, it should be appreciated that the compressed image and sets of control parameters may also be provided separately, for example by providing the compression apparatus and the decompression apparatus with separate sub-outputs and sub-inputs for these signals. This has the disadvantage that a more complex method of transferring the signals is needed, but it has the advantage that the sets of control parameters may be omitted when not needed, for example the compressed image is offered to subscribers with and without post-processing option.

Post Filtering

Parameter estimator 16 selects parameters for controlling post-filtering by post filter 26. Parameter estimator 16 supplies the selected parameters to stream multiplexer 18, which adds the parameters to the compressed stream. Stream demultiplexer 22 extracts the parameters and supplies the extracted parameters to post filter 26. Post filter 26 uses the parameters to control post-filtering.

Figure 3:
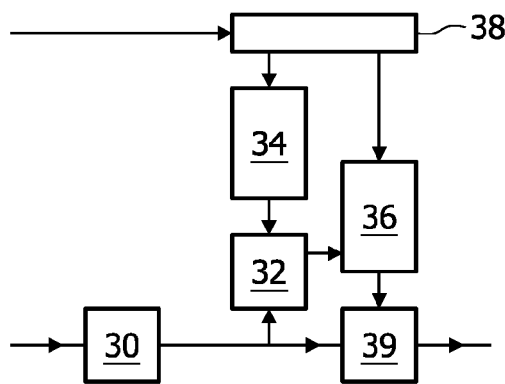
FIG. 3 shows an embodiment of a post filter.

FIG. 3 shows an embodiment of a post filter. In this embodiment the post filter comprises a window collector 30, a cluster selector 32, a cluster definition memory 34, a coefficient memory 36, a control interface 38 and a FIR filter 39. Window collector 30 is coupled to the output of the decompressor (not shown) and has an output coupled to FIR filter 39. Cluster selector 32 has inputs coupled to the output of window collector 30 and cluster definition memory 34. Cluster selector 32 has an output coupled to an input of coefficient memory 36. Coefficient memory 36 has an output coupled to a coefficient input of FIR filter 39. Control interface 38 has an input for receiving control data from the stream demultiplexer (not shown) and outputs coupled to cluster definition memory 34 and coefficient memory 36. Although the various elements of FIG. 1, such as memories 34, 36 have been shown as parts of post filter 26, it should be understood that they can also be regarded as separate parts of the decompression apparatus without being part of the post-filter.

In operation window collector 30 collects pixel values for pixel locations in a moving window of pixel locations in an image (e.g. a 3×3 pixel location window). Window collector 30 applies pixel values for the window to FIR filter 39. FIR filter 39 computes the output pixel value as a sum of products of the pixel values with filter coefficients. Each product is computed for a respective location in the window, from the pixel value and the filter coefficient associated with that location. The sum of the products may be normalized and is output as post-filtered pixel value for a pixel location corresponding to a location of the window. This is repeated for a series of window locations, to produce output pixel values for a series of pixel locations at predetermined relative positions with respect to the window locations (e.g. output pixel locations at the central points of the 3×3 windows, but other predetermined relative positions may be used).

Cluster selector 32 and coefficient memory 36 control the coefficients that are used by FIR filter 39. Information in cluster definition memory 34 defines a plurality of clusters, each corresponding to a set of possible combinations of pixel values in the window. Coefficient memory 36 stores a respective set of filter coefficients for each cluster. Cluster selector 32 receives the combination of pixel values in the current window that has been produced by the decompressor (not shown) and from these pixel values cluster selector 32 classifies the content of the window, that is, it determines the cluster to which this combination belongs. Cluster selector 32 uses an identification of this cluster to address coefficient memory 36 and in response coefficient memory 36 supplies the corresponding set of filter coefficients to FIR filter 39. This is repeated for a series of window locations. Thus, for each window location the pixel values are filtered according to the classification of the window location (the cluster selected for the window location), to produce an output pixel value for a respective pixel location.

In an embodiment cluster definition memory 34 stores representative combinations of pixel values for each cluster. In this embodiment the clusters are defined by distance to these representative combinations. Any given combination of pixel values has different distances to different ones of the representative combinations of pixel values. The given combination belongs to that one of the clusters that has the representative combination at the smallest distance.

In this embodiment cluster selector 32 classifies by identifying the representative combination at least distance. In a further embodiment only the luminance component of the pixel values is used to define the clusters. Thus for example, if 3×3 windows are used, each representative combination comprises nine luminance values $$(Y1(j), Y2(j), \ldots Y9(j))$$

Herein "j" is a label of the cluster. In this embodiment cluster selector 32 receives the luminance values (L1, L2, ... L9) for the pixel locations in the current window and selects the cluster j that minimizes the distance $$|L1-Y1(j)|+|L2-Y2(j)|+\ldots+|L9-Y9(j)|$$

(| | denotes the absolute value). In this embodiment cluster selector 32 uses the label j to select the set of filter coefficients.

Figure 3A:
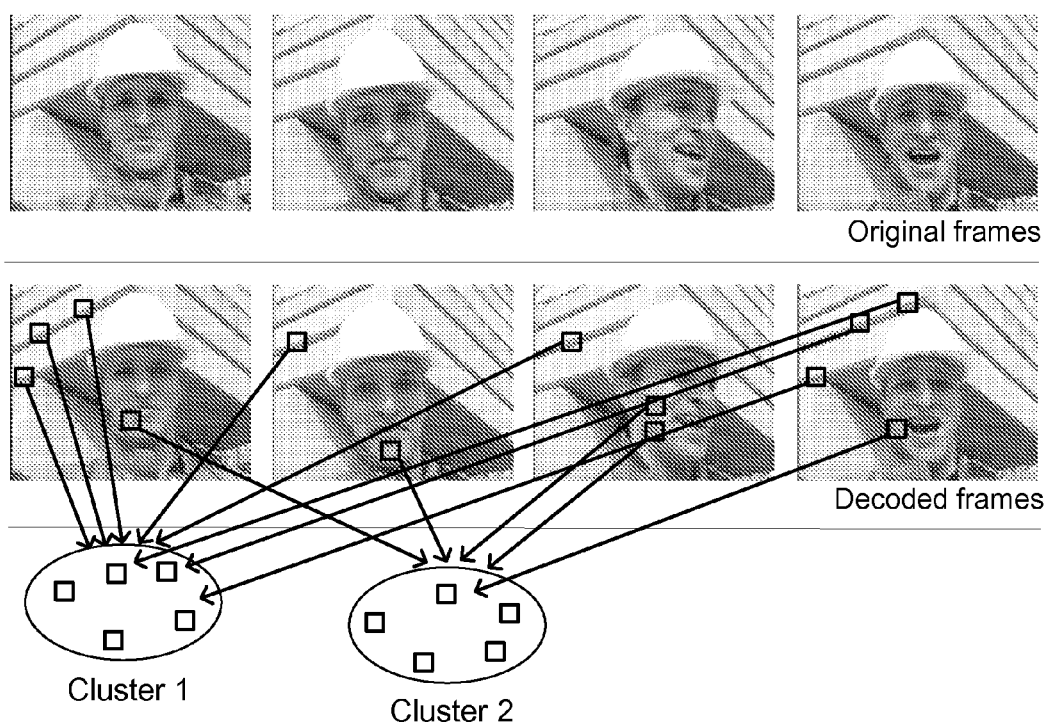
FIG. 3a illustrates clustering of pixels.

FIG. 3a shows an example is which in a scene a few key frames are selected for finding the filter coefficients. The feature vector for clustering is the luminance in the local 3×3 window around a pixel as explained above. The upper row in FIG. 3a gives the original frames, the bottom row the decoded frames. Elements of several clusters are indicated in the bottom row. The clusters comprise areas or pixels with similar patterns. In this example 20 clusters are used. FIG. 3a shows that similar patterns are clustered into clusters. The clusters are dispersed over the image, which is often the case, since the clusters are comprised of similar patterns over the images. The clustering algorithms may be based on different schemes and formulae to find similar patterns. In this example the algorithm is based on luminance values.

Figure 3B:
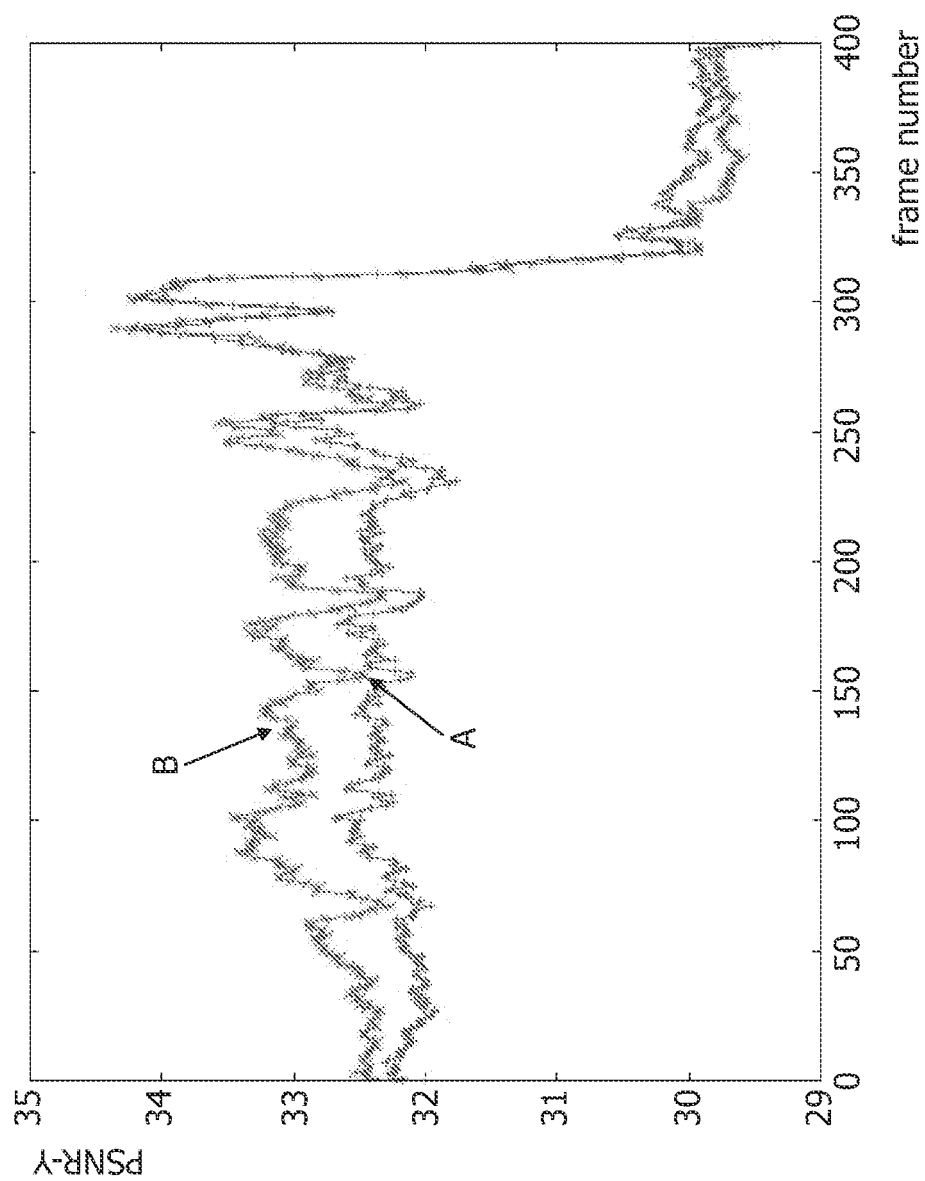
FIGS. 3b, 3c and 3d illustrate the positive effect.

FIG. 3b shows for this scene the positive effect. In a graph form the average PSNR-Y, a measure for distortion. Curve A illustrates the PSNR-Y value for the decoded signal; curve B illustrates the PSNR-Y value after application of clustering and applying the adaptive filter. The average PSNR-Y is increased from 32.38 Db to 32.89 Db, an improvement of 0.5 dB.

It should be noticed that a scene change is present around frame 315 and after said scene change the clustering of the previous scene is no longer optimal. A detection of degradation can be used to dynamically update the cluster selection and corresponding filter coefficients. In an off-line scenario a possible scene change can be pre-determined by scene partitioning.

Figure 3C:
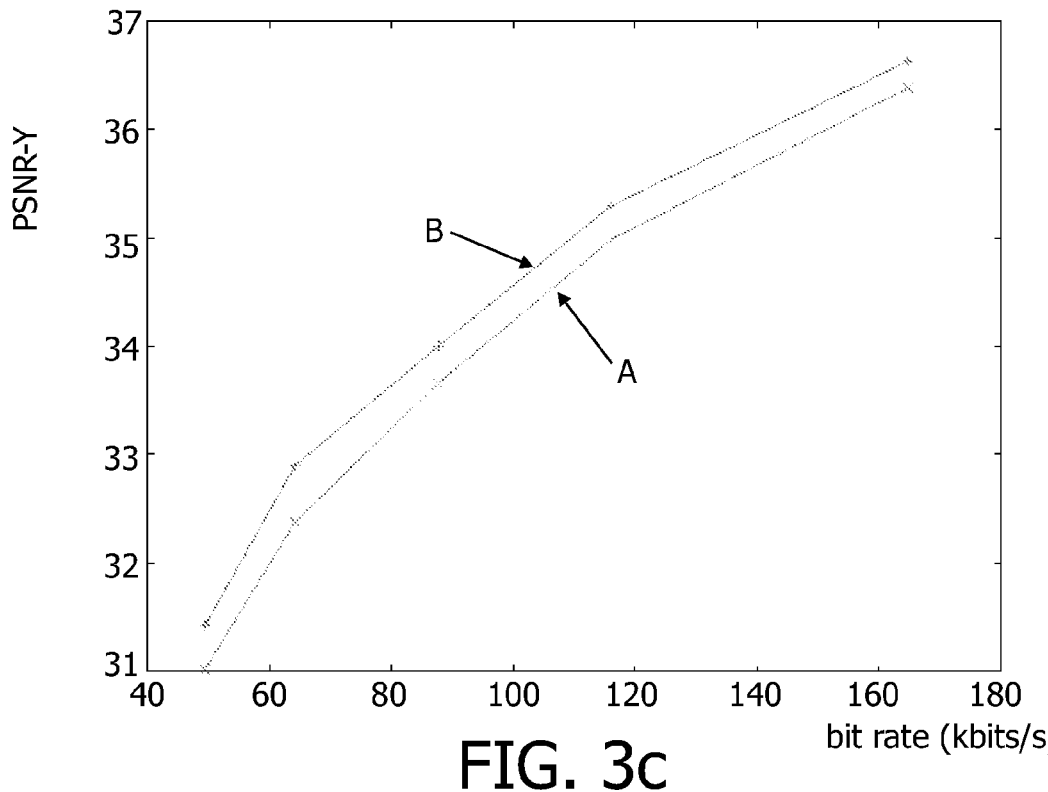

FIG. 3c illustrates the increase in PSNR-Y value for H.264 encoded video as a function of bit rate. At all bit rates a remarkable increase in PSNR-Y value is present.

Figure 3D:
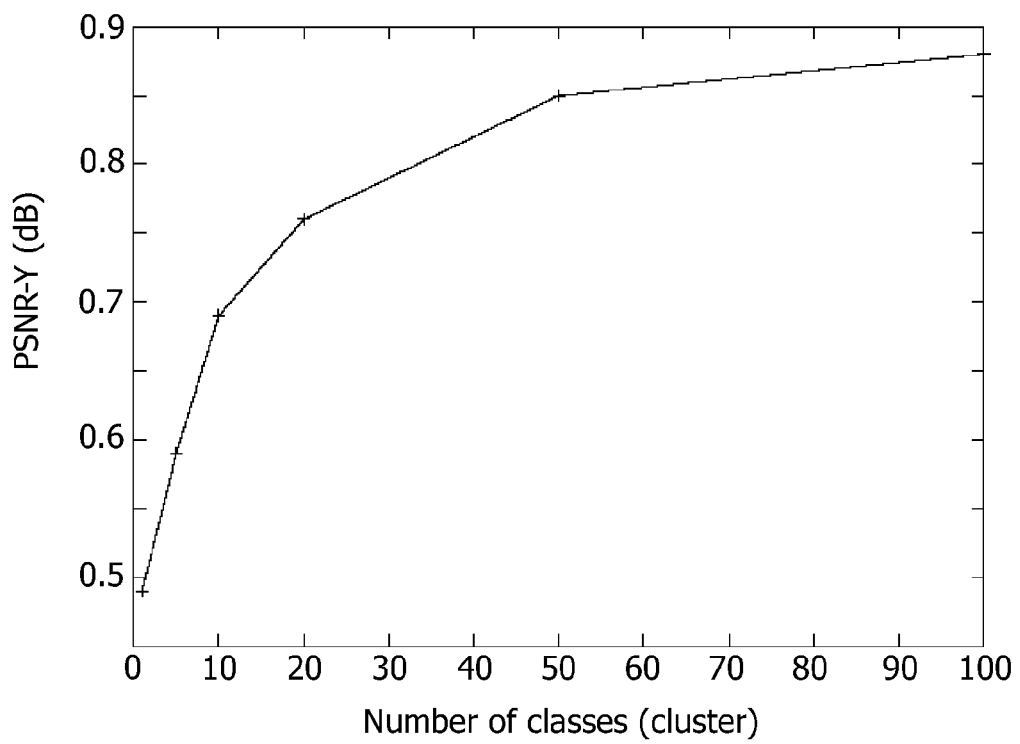

FIG. 3d illustrates the increase in PSNR-Y value as a function of the number of clusters. A preferred number of clusters is 5 or higher, most preferably less than 30. As the number of clusters increase the computational load increases, while the additional gain becomes smaller.

In this example, for one video scene, the post-processing function includes 40 floating point numbers (cluster centers and filter coefficients). This information can be further quantized and entropy-coded to further reduce bit costs. Considering the amount of image frames, belonging to one scene) that can be post-processed with the same data, this extra costs can be neglected in practical sense, while the advantage is considerable and measurable.

It should be emphasized that this embodiment is merely an example. Any other method of defining clusters may be used. For example, pixels values from different locations in the window may be weighed differently in the computation of the distance, or color components may be weighed differently (e.g. by using only one color component to cluster). Instead of a sum of absolute values a sum of squares may be used for example.

Instead of a distance to a set of luminance values a distance to a set of scalar products of the combination of luminance values with standard vectors of luminance values may be used etc. Instead of representative vectors for individual clusters a system of reference vectors may be used to control selections between groups of clusters along a decision tree. Instead of representative vectors difference vectors may be provided for selecting between clusters or groups of clusters etc. Herein "classifying a vector" will be used to any such type of classification, irrespective of whether the classification is performed by first grouping the relevant components of the vector into a vector, or merely by considering the components: in the context of "classifying" the term "vector" is used to indicate that a number of components is used for classification Correspondingly cluster selector 32 may use other methods to select a cluster and component of "cluster vectors", that are used in the classification.

Although an embodiment has been described wherein the cluster is selected by means of decompressed values Y1, Y2, ... for a window of adjacent pixel locations, it should be appreciated that alternatively signal values for different combinations of locations may be used. For example, instead of a combination of individual pixel values from a 3×3 window, a combination of average pixel values each for a respective one of a set of blocks of pixel locations may be used. For example 8×8 pixel blocks in a 3×3 window of such blocks. As another example, instead of a combination of individual pixel values from a 3×3 window, sub-sampled values from predetermined non-adjacent locations relative to the current pixel location may be used to select the cluster.

As a further example the following steps may be used to derive the classes:

1. All M×M neighborhood windows of each pixel from a subset of the decoded frames constituting a given image information are extracted from the image information. Each window is represented by a feature vector x' consisting of its luminance. The vector may be normalized by subtraction from each vector the mean of all components. Thus a 4×4 window around a pixel is represented by a 16 dimensional vector with 0 ... 255 (for 256 colors) values on all of its axes. A 5×5 window by a 25 dimensional vector etc.

2. The feature vectors are sampled into a pre-defined number of classes N such that the totals within-class variance $$V = \sum_{i=1}^{N} \sum_{x' \in C_i} |x' - \mu_i'|^2$$

In the above there are a total of N classes $C_i$ ($1 \leq i \leq N$), x' is sample 16 or 25-dimensional vector (for 4×4, respectively 5×5 windows) and $\mu_i'$ is the mean vector of all vectors x' belonging to class $C_i$. Such classification can easily by using an iterative approach. As a result the center of each class or cluster, cluster and class denoting the same, i.e. a number of elements, is found. This centre is stored to represent the class. The vectors closest to each center form part of a cluster or class. In this example the sum of squares is used, in the previous example the sum of absolute values is used. In each example a total of N classes is used.

3. for each identified class filter coefficients are determined. The application of the filter to the decoded frames provides a new pixel value p" for each pixel in the decoded low res frame, p" being based on the M×M neighbourhood of the pixel. The goal is to minimize the MSE (mean square error) between the predicted value p" and the corresponding original pixel value p for all the samples in each class. This can be seen as a standard least-squares problem that can be solved with multivariate linear regression or other known techniques to solve least-squares problems.

Using filters based on a 5×5 window and a total of 5 classes typical improvements in PSNR-Y values, compared to other known techniques of around 1 dB were found.

Also, the window used for selecting the cluster need not be the same as the window used in the FIR-filter. Although it is preferred that these windows at least overlap, so that the selected filter coefficients for a pixel location are dependent on a near context of that location, the cluster may also be selected on the basis of a window that does not overlap with the window used by the FIR filter.

Furthermore, instead of (or in addition to) pixel values motion vectors may be used to classify locations. As is known per se, an image in a video stream can be encoded in terms of motion vectors for blocks of pixels that define for each block the location of a block in another image from which pixel values must be copied into the block. In an embodiment motion vectors of a plurality of blocks at predetermined locations relative to a pixel location may be used to assign the pixel location to a cluster. This can be done in much the same way as clustering according to pixel value.

Figure 4:
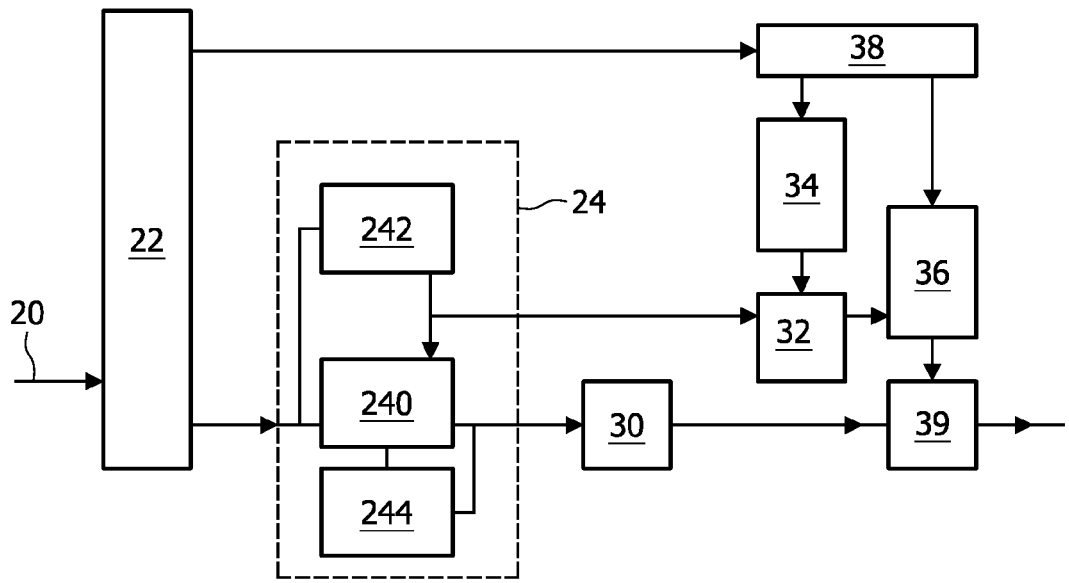
FIG. 4 shows a decompression apparatus.

FIG. 4 shows an embodiment wherein decompressor 24 comprises an image decompressor 240, a motion vector extractor 242 and a reference image memory 244. Herein motion vector extractor 242 extracts motion vectors from incoming video information and supplies the extracted motion vectors to image decompressor 240 to indicate from where in reference image memory 244 blocks of pixels must be fetched. In addition the extracted motion vectors are supplied to cluster selector 32, which uses the motion vectors differences between a "vector of motion vectors" for blocks at predetermined positions relative to a pixel location with representative vectors of motion vectors for different clusters. Of course, cluster selection on the basis of motion vectors may also be performed by methods other than determination of differences with representative vectors. Also, it should be realized that both motion vectors for motion to the image and/or vectors for motion from the image may be used for clustering. Furthermore, although preferably encoded motion vectors from the video stream may be used, it should be appreciated that alternatively motion vectors may be used that are determined in a predetermined way from the image content of images in the video stream.

In another embodiment selector 32 may use differences with representative vectors that contain both pixel values and motion vectors, wherein different weights may be used for different components of the representative vectors in the determination of the difference.

It should be noted that clusters used are clusters in the space of possible combinations of pixel values in a window and not clusters of pixel locations. In practice it is observed that the combinations of pixel values for windows at neighboring window locations often result in the same cluster selection, but this does not define the clusters. This form of post filtering works well even if, when an image region has window locations that mostly have one assigned cluster, many window locations in that region have different assigned clusters. In the end it is the filtered pixel value that matters, not the cluster that was used to obtain it.

Furthermore, although a FIR filter 39 has been used by way of example, it should be appreciated that other type of filter may be used instead. For example, a non-linear filter may be used, or a recursive filter wherein the output depends on a filter output for one or more neighboring locations. Also, of course, a window of any other size than 3×3 may be used, e.g. a 3×1 sized window (three pixel locations horizontally and one vertically).

In the preceding examples information that defines the images, such as pixel values, motion vectors etc. was used to select the clusters. In addition explicit cluster selection information may also be included in the compressed image signal. This increase the size of the signal, but it may help to simplify classification. In an embodiment such explicit cluster selection signals may be the only information used by the decompression apparatus to select the clusters.

Any convenient implementation of the components of the post filter may be used. In one example, post filter uses a complete stored image in a memory and window collector 30 retrieves the pixel values for the window from the memory. In another embodiment window collector 30 only buffers pixel values from a sufficient number of image lines to provide the pixel values for the windows. The different components may be implemented using one or more programmable processing circuits, programmed with a program to make the processing circuit operate as the relevant component. One programmable processing circuit may be used to operate as different ones of the components under control of different programs, or different processing circuits may be used. As an alternative, the components may be implemented using dedicated circuits or as a mixture of programmed and dedicated circuits.

As shown, post-filter 26 and associated is part of a full decompression apparatus. However, it should be appreciated that it may be implemented in a separate device. In an embodiment such a device may be used as an interface between a mobile device, such as a mobile telephone, and a higher quality display device (e.g. a television monitor). In another embodiment the decompression apparatus may recompress the result of post-filtering in order to generate a video stream of improved quality.

Parameter Estimation

Figure 5:
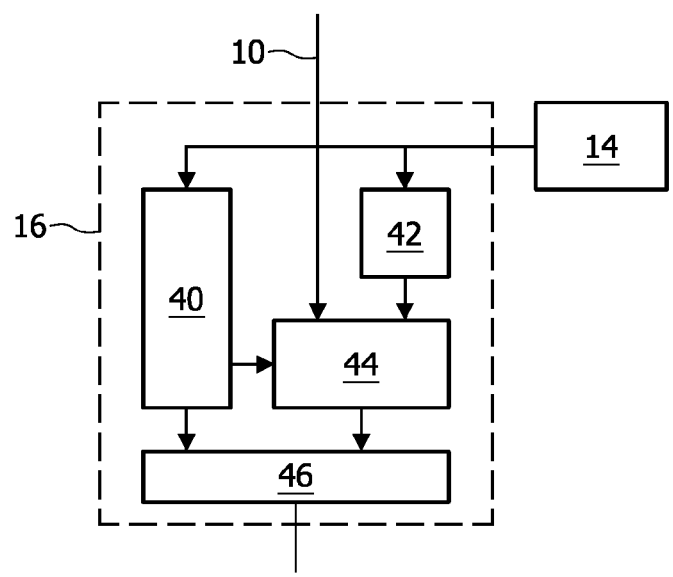
FIG. 5 shows a diagram of a parameter estimator 16.

FIG. 5 shows a diagram of a parameter estimator 16. Parameter estimator 16 comprises a clustering unit 40, a window collector 42, a coefficient selector 44 and an output interface 46. Coefficient selector 44 has inputs coupled to stream input 10 and decompressor 14, the latter via window collector 42, and a control input coupled to clustering unit 40.

In operation coefficient selector 44 selects sets of filter coefficients for respective clusters. For each cluster a set of coefficients may be selected that minimizes an averaged measure of difference between pixel values from stream input 10 and pixel values obtained by using the set of filter coefficients for post filtering the results of compression and decompression by compressor 12 and decompressor 14. The averaged measure of difference is taken averaged over pixel locations that are assigned to the same cluster. The mean square difference may be used for example, but any other measure may be used, such as a statistical measure of perceptual difference. Techniques for selecting sets of coefficients that minimize an averaged measure for a given set of pixels are known per se.

Clustering unit 40 determines to which clusters pixels are assigned. This may be done in a way that corresponds to cluster selection in the decompression apparatus. In an embodiment clustering unit 40 also selects the clusters. Any clustering technique may be used (with clustering we don't just mean blind finding of separated clusters, but also a classification to predefined clusters will work). By using a plurality of different clusters, combined with sets of filter coefficients that minimized difference between the results of post-filtering and the original pixel value within the respective clusters, it is ensured that the overall measure of difference (e.g. a sum of squared differences) between the post filtered image and the original image is smaller that obtained if a single set of filter coefficients were used for the entire image. This reduces the overall difference already for arbitrarily selected clusters. However, in several embodiments the clusters are selected to optimize the reduction of the difference. Selection of cluster may be performed before the filter coefficients for the clusters are selected, or in combination with filter coefficient selection.

The general concept of the invention is based on analyzing what kind of structure was present in the original image, and how the compressed version could be improved at the decoder side (e.g. typically looking more like the original; or in general have a higher image quality, e.g. sharpness) by applying a particular one of a set of image optimized/trained filters, the coefficients/parameters of said filters being added to the signal. Only limited extra data needs to be transmitted to specify those filters; and e.g. a couple of image locations on which some of them are applied.

Many variants of this inventive concepts are be possible and a number are described below, such variants can improve existing coding schemes such as H265.

In general, one could simply classify all occurring structures in several classes (e.g. edge, high frequency horizontal texture, . . . ), but within the broader concept of the invention one could do the classification in a more structured/hierarchical parametric ways including a hierarchical structuring, for instance first finding out which type of classification is best suited and then performing the classification, or also to reclassify or differently classify, for instance the selection of clusters and corresponding filter or post-processing parameters may be done in an iterative manner.

In a first step clusters may be defined, followed by defining the post-processing parameters associated with the clusters.

This scheme will generally provide a good result, but within the framework of the invention iterative processes may be applied. For instance finding a tentative clustering, finding the sets of filter parameters for the tentative clusters, refine the clustering to find more suitable clusters, refine the sets of filter parameters. etc;

A number of possible iterative processes are for instance:
initially all elements within a cluster are given the same weight for the determination of the post-processing parameters. Once the initial sets of parameters and corresponding cluster centers are determined, providing an initial result for an average difference between the original pixel values and pixel values after post-processing, variable weights are attributed to each element within a cluster for instance in a predetermined but adjustable manner dependent on a distance measure to the cluster centre. Using such weights filter coefficients are recalculated; if the result improves the process is reiterated until no further gain is obtained or the increase in gain drops below a threshold. A simple embodiment of this scheme would be to remove 'odd' points within a cluster from the calculation for the cluster or post-processing parameters, i.e. putting the weights for such elements at zero.

Wherein, in the above embodiment the elements of clusters remain the same, but their impact on the calculation of coefficients is altered, an alternative scheme would be to keep the determined filter coefficients the same as well as the cluster centers, but to shift elements from one cluster to another, thereby shifting the borders between the clusters, and recalculate the difference between the original pixel values and the pixel values after post-processing. If there is an improvement, the borders are shifted somewhat further.

The manner in which the cluster centers and clusters are defined is dependent on the clustering algorithm. As explained above as well as below, there are various clustering algorithms possible, differing in their basis of clustering (on pixel values, on motion vectors, on edge, on texture etc) as well as the way in which the clustering is determined (minimization of sum of absolute values, or minimization of sum of squares). Another embodiment is to use a clustering algorithm that combine various criteria, such as pixel values and motion vectors and/or yet other criteria and use a mix of such criteria wherein in an iterative process the optimum mix of criteria and corresponding sets of parameters is found.

Within the framework of the invention are also enclosed variants on quickly finding the optimal filters at the encoding side, e.g. by tracking through coefficient space, spectral analysis of Pinput/Pcompressed.

In an embodiment clustering unit 40 applies a clustering technique identifies representative combinations of pixel values that define a partition of the space of possible combinations in to parts at closest distance to respective representative combinations. The representative combinations are selected on the basis of a predetermined cluster quality criterion. The cluster quality criterion may be for example that the number of actually observed combinations in each partition is the same within some predetermined error margin, or that a measure of spread (e.g. a sum of squared distances to a central pixel value) of the actually observed combinations within each partition is below a threshold. A k-means clustering algorithm to group combinations of decompressed pixel values that occur in the windows may be used for example. By using such clusters, it is ensured that each set of filter coefficients applies to windows with similar content. This minimizes the error after post-filtering.

In a further embodiment a clustering method using a quality criterion based on the residual error after post-filtering is used. In an example of such an embodiment an initial definition of the clusters is made, sets of filter coefficients are selected for each cluster and the size of the residual errors for different pixel positions are computed. If the average size for a cluster is above a threshold, the cluster is split, taking two actually observed combinations from the original cluster as new representative combinations. Similarly, clusters may be merged if the average size of the errors in neighboring clusters is below a threshold and/or the difference between the set of filter coefficients for these clusters is below a threshold. By repeating this procedure a number of times the set of clusters can be optimized. This is a further example of an iterative process.

Output interface 46 has inputs coupled to clustering unit 40 and coefficient selector 44. Output interface 46 supplies information that represents the clusters and the filter coefficients to stream multiplexer 18 for supply to the decompression apparatus, where they will be used by post-filter 26.

In an embodiment wherein a stream of video images is compressed clusters and coefficients are selected for each image in the stream. However, this is not necessary. The clusters and coefficients are typically scene dependent. When scenes (or similar scenes) are pictured in a series of images the same clusters and coefficients may be used for all these images. In another embodiment parameter estimator 16 is configured to detect groups of images wherein the same clusters and coefficients can be used and only signals when the clusters and coefficients are changed. In this case post filter 26 retains a previously received cluster definition and set of filter coefficients and applies them to post filter decompresses images until it is signaled that the clusters and coefficients are changed.

In this embodiment parameter estimator 16 may compute the size of the residual errors after post-filtering using a current set for each incoming image and switch to computation of a new set of clusters and coefficients only if the size exceeds a threshold (and optionally also after a predetermined number of images since the last new set of clusters and coefficients). In another embodiment parameter estimator 16 may first select sections of the video stream, and compute a set of clusters and coefficients for each section. In this case parameter estimator 16 may select the clusters and coefficients by processing only one of the images in the section or a subset of the images in the section.

As an alternative the groups may be detected by evaluating image characteristics according to predetermined functions and assigning images to a same group if the image characteristics differs less than a predetermined threshold. The image characteristics of each newly received image may be received and compared to those of an image for which the current set of clusters and coefficients has been used, the set of clusters and coefficients being kept the same if the image characteristics differs less than a threshold.

In an embodiment different sets of clusters and coefficients may be used for differently compressed images and/or different object planes. Thus, for example a first sets of clusters and coefficients may be defined for intra-coded images (I-frames in the case of MPEG) and a second set of clusters and coefficients may be defined for images coded by means of prediction from nearby images and optional residues (P frames and B frame in the case of MPEG). As another example, if image content is defined in the video stream for a plurality of planes that can be overlaid to form an output image, different sets of clusters and coefficients may be used for different planes.

In an embodiment the set of clusters may be the same for these images or planes, but different coefficients may be used, each selected to reduce errors in a different type of frame. In this embodiment the post-filter 26 stores a plurality of clusters definitions and/or coefficients contemporaneously and selects from this plurality dependent on the coding type (I or B,P) and/or plane. Similarly parameter estimator 16 selects the clusters and coefficients based on the coding type and/or plane.

In an embodiment the decompression apparatus is configured to store a plurality of sets of clusters and/or coefficients concurrently for example in cluster definition memory 34, and coefficient memory 36 in post filter 26. The decompression apparatus selects a current set from the plurality of stored sets dependent on a set selection signal, for use to post-filter a current image. The set selection signal may be provided from stream demultiplexer 22 on the basis of a selection signal provided from the compression apparatus or on the basis of the type of image and/or plane.

In a further embodiment the compression apparatus is configured to store a corresponding plurality of sets of clusters and/or coefficients. When a new image (or object plane) is received the parameter estimator first tests whether it can be assigned to one of the stored sets of clusters and/or coefficients. This may be done for example by compressing the new image, decompressing it, and post-filtering it according to each of the stored sets of clusters and coefficients and comparing the results with the original new image, the set of clusters and coefficients being selected that leads to the least difference. If this difference is below a predetermined threshold the compression apparatus signals to the decompression apparatus that the selected set of clusters and/or coefficients should be used. However, alternatively selection of a set of clusters and/or coefficients may be performed by classifying the new image according to some predetermined image characteristics and selecting a set of clusters and/or coefficients that is associated with the selected class of the image.

When the difference between the new image and the result of compression, subsequent decompression and post-filtering with the selected set of clusters and/or coefficients exceeds the threshold a new set of clusters and/or coefficients is estimated and transmitted to the decompression apparatus, to replace a previous set of clusters and/or coefficients in memory, the previous set being selected according to the same criterion in the compression apparatus and the decompression apparatus for example by explicitly identifying this the previous set in a signal from the compression apparatus to the decompression apparatus, by using the least recently used set, or a most similar set etc.

Although an example has been described wherein a post-filter after decompression is controlled using information indicated by the compression apparatus, it should be understood that other forms of post-processing may be used as well.

Figure 6:
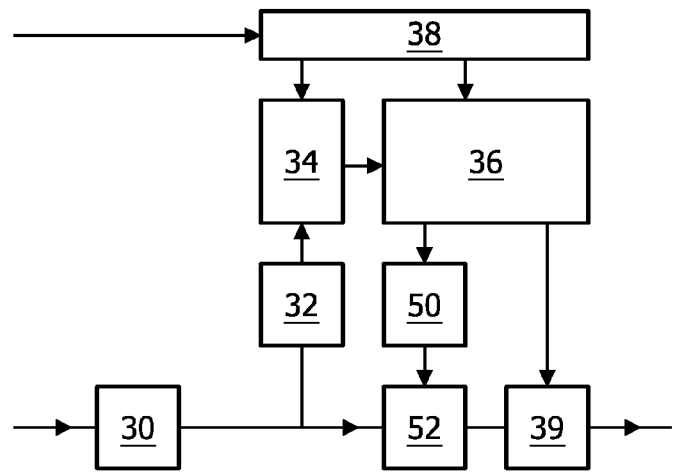
FIG. 6 shows a post-processor.

FIG. 6 shows an example of a post processing circuit that may be used instead of post-filter 26. In this post processing circuit a (pseudo-) random signal generator 50 and an adder 52 have been added. The random signal generator 50 generates a (pseudo-) random signal under control of one or more coefficients from coefficient memory 36. Adder 52 adds these coefficients to the decompressed signal. Random signal generator 50 may be configured to control an average and/or a standard deviation of the random signal and/or spatial correlation and/or a spectral envelope and/or other statistical properties of the generated random signal as a function of the coefficient or coefficients. In this way locally generated texture can be added to the decompressed signal. The relevant coefficient or coefficients are estimated in the parameter estimator of the compression apparatus from statistics of a difference between the original image and the decompressed-compressed image. The estimated relevant coefficient or coefficients are transmitted from the encoding apparatus to the decoding apparatus. Thus, instead of data representing actual pixel values coefficients representing statistical properties are transmitted.

It should be emphasized that this is only one example of texture generation. Instead of (pseudo-) random signal generator 50 other types of signal generator may be used for adding, or even partially substituting, locally generated signals to the decompressed image, the locally generated signals being generated under control of coefficients signaled by the decompression apparatus. For example the random generator may use the coefficients to control a set of values from which it makes random selections to generate pixel values, or to control basic texture patterns from which it randomly maps pixels to the output signal. To provide more freedom of texture generation, texture generation may be combined with an embodiment wherein the set of coefficients is selected by means of decompressed signal values for combinations of average pixel values for respective ones of a set of blocks of pixel locations (e.g. for in a 3×3 window of such blocks, using e.g. 8×8 pixel blocks), or sub-sampled values for non-adjacent pixel locations.

In a further embodiment a combination of texture generation and filtering is used, with coefficients selected under control of the detected cluster. In another embodiment only post-filtering or only texture generation is used, dependent on the cluster.

In the embodiments described so far post-processing such as post-filtering is applied to the final image resulting of decompression. This has the advantage that any form of compression and decompression can be used. However, it should be appreciated that alternatively post-processing can be applied to intermediate results of decompression. For example, when an inverse DCT (Discrete Cosine Transform) of decompressed frequency coefficients is used as part of decompression, post-processing may also be applied to the frequency coefficients, for example by multiplying coefficients for different frequencies with different factors. Similarly texture information may be added to such coefficients.

The parameter estimator and the post-filter may be combined with various types of compressor and decompressor. In an embodiment the compressor is a quantizing compressor, for example a compressor that computes DCT (Discrete Cosine Transform) coefficients for a block of pixels and quantizes these coefficients, or a compressor that quantizes pixel values. In another embodiment the compressor may be a compressor that reduces the spatial resolution of the image. Correspondingly the decompressors may apply inverse quantization or interpolation to reconstruct decompressed images.

Figure 7:
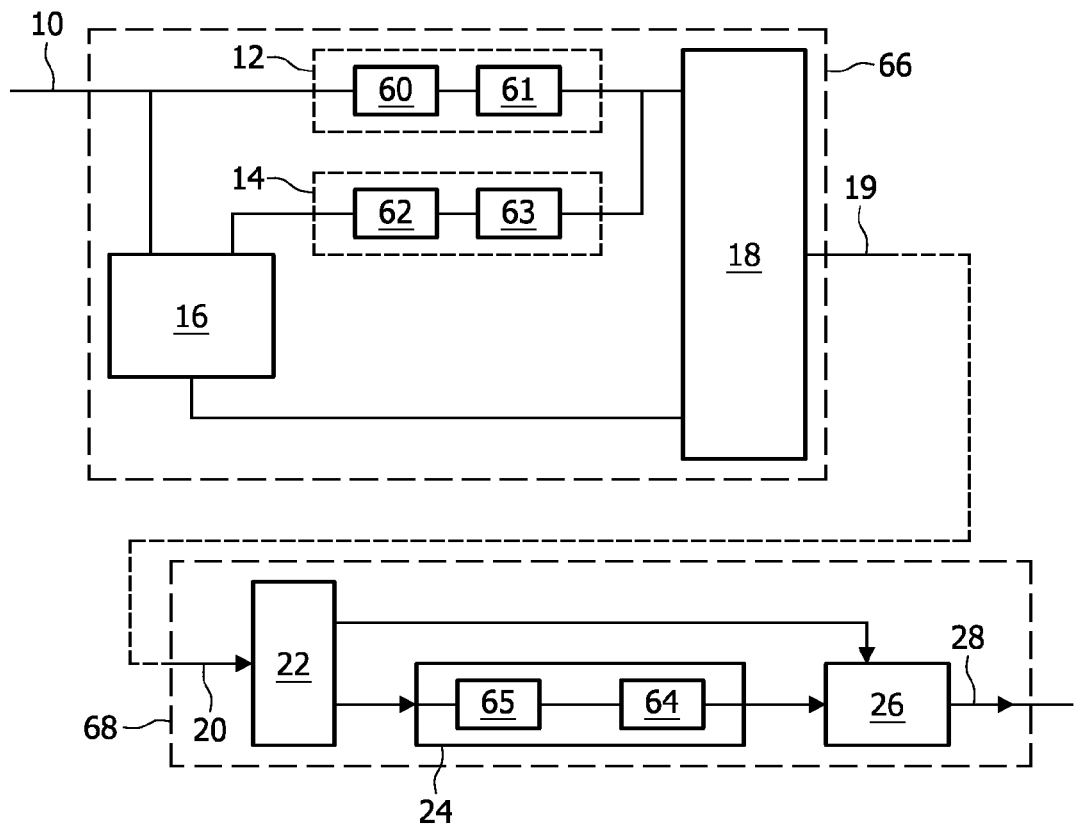
FIG. 7 shows a compression-decompression system.

FIG. 7 shows an application to compression that comprises resolution scaling and quantization. Herein the sets of filter coefficients are used to reduce artefacts of both forms of compression. The figure shows a compression apparatus 66 and a decompression apparatus 68. In the compression apparatus 66 compressor 12 comprises a resolution scaler 60 and a quantizing compressor 61 in series. In an embodiment quantizing compressor 61 computes DCT (Discrete Cosine Transform) coefficients for blocks of pixels and quantizes these coefficients. Resolution scaler 60, may comprise an anti-alias filter and a sub-sampling unit. The decompressor comprises an inverse quantizing decompressor 63 and an inverse resolution scaler 62 in series. In the decompression apparatus 68 the decompressor comprises an inverse quantizing decompressor 65 and an inverse resolution scaler 64 in series in front of post-filter 26.

In operation resolution scaler 60, which may comprise an anti-alias filter and a sub-sampling unit, reduces the resolution of with which the received images are represented, before compressing the images. Inverse resolution scaler 62 reconstructs images of the original resolution, or at least a higher resolution than compressed and successively decompressed reduced resolution images.

Parameter estimator 16 selects sets of filter coefficients and optionally clusters for a post filter operation that, when applied to the reconstructed images, will make these images correspond more closely to images corresponding to the original input images.

In the decompression apparatus 68 the images are decompressed and subsequently the resolution is scaled up. The scaled up images are post-filtered using the selected sets of filter coefficients. Although the post-filter 26 and inverse resolution scaler 64 have been shown as separate units, it should be appreciated that they may be integrated, the filter coefficients defining how pixel values must be interpolated during upscaling.

Although in the illustrated embodiment the applicable cluster is selected under control of pixel values of the scaled up image, it should be understood that alternatively the clusters may be selected on the basis of pixel values from the decompressed reduced resolution image, i.e. the image from an inverse quantizing decompressor 65. In an embodiment this is done in both compression apparatus 66 and decompression apparatus 68.

In an embodiment, quantizing compressor 61 and inverse quantizing decompressor 63 may be omitted so that resolution reduction is the only form of compression. In this case post-filter 26 is used only to reduce artefacts due to resolution reduction and subsequent reconstruction of a higher resolution image. In FIG. 7 post-filter 26 is used both to reduce artefacts due to resolution reduction and quantization.

Figure 8:
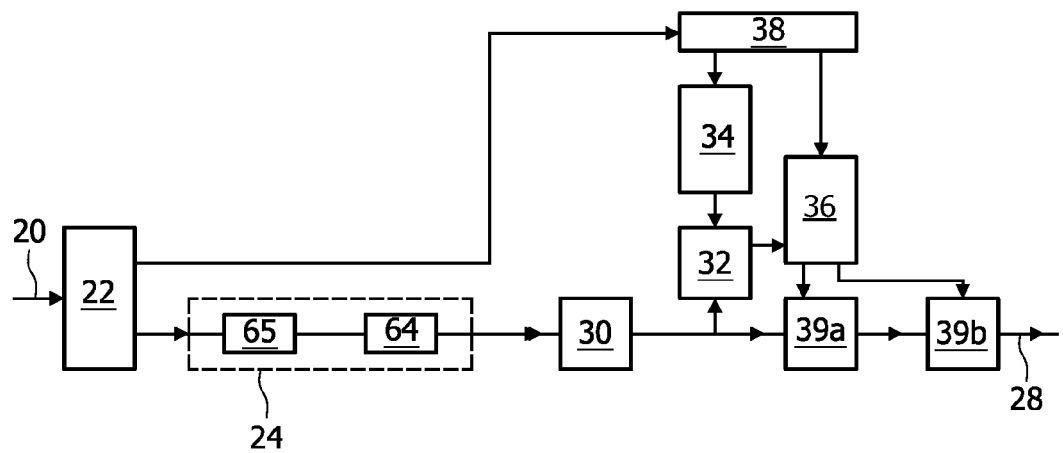
FIG. 8 shows a compression apparatus.

Furthermore, as shown in FIG. 8, as an alternative embodiment separate post-filters 39a, 39b may be used in series as sub-filters in decompression apparatus 68 for correction of artefacts due to compression by compressor 12 and artefacts due to resolution reduction by resolution scaler 60. In this embodiment separate sets of filter coefficients may be provided for these different post filter operations. This has the advantage that the different sets can be optimized for different functions. In an embodiment different sets of clusters may be defined for different ones of the post-filters 39a,b, and post-filter coefficients for the post-filters may be provided for the clusters defined for that post-filter 39a,b. Thus, in effect, the clusters for the combination of first and second post filter 39a, 39b define sub-clusterings of the clusters for individual post-filters. Different sub-clusters in the sub-clustering share the same set of filter coefficients. Alternatively, the sub-clusters may be determined first and then be subsequently joined into super clusters for a selected post-filter, the sub-clusters in each super cluster sharing a set of filter coefficients for the selected post filter. In this case the no separate sets of filter coefficients need be transmitted for different sub-clusters, which saves transmission bandwidth.

Figure 9:
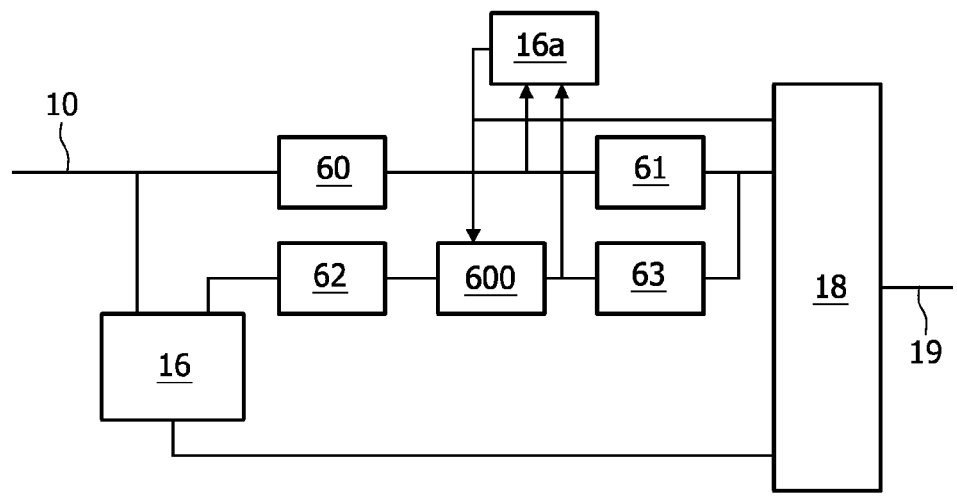
FIG. 9 shows a decompression apparatus.

FIG. 9 shows a further embodiment of a compression apparatus for generating such a plurality of sets. In this embodiment the compression apparatus an additional parameter estimator 16a and a post-filter 600 have been added. Post-filter 600 is coupled between inverse quantizing decompressor 63 and inverse resolution scaler 64. Additional parameter estimator 16a has inputs coupled to the output of resolution scaler 60 and the output of an inverse quantizing decompressor 63 and an output coupled to a control input of post-filter 600 and multiplexer 18.

In this embodiment additional parameter estimator 16a serves to provide sets of control parameters for reducing artefacts due to compression, whereas parameter estimator 16 serves to provide control parameter sets for reducing remaining artefacts, mainly due to resolution reduction and up-scaling. Additional parameter estimator 16a selects sets of control parameters of a post-filter operation that reduces the difference between the image before compression by quantizing compressor 61 and after inverse quantizing decompressor 63. Post-filter 600 applies a post filter operation selected by these control parameter sets to the decompressed image before passing the image to inverse resolution scaler 62.

Multiplexer 18 adds these control parameter sets to the stream, for use by the post filters of the decompression apparatus.

It may be noted that that part of FIG. 9 excluding resolution scaler 60, post filter 600, inverse resolution scaler 62 and parameter estimator 16 is essentially identical to the compression apparatus of FIG. 1, with the input of decompressor 14 forming the image input. As shown, the embodiment of FIG. 9 adds an additional layer of compression, with corresponding parameter estimation after decompression. As will be appreciated, in each case a parameter estimator is used to derive control parameter sets by comparing an image before a compressive processing operation and after a decompressive processing operation that is an inverse of this compressive processing operation. Sets of control parameters are selected for different clusters of local image configurations.

As shown in FIG. 9, when successive compressive operations are applied, the parameter estimation can be applied a plurality of times, each for a respective compressive operation. Although an example has been shown wherein the compressive operations are decimation and quantization, but other compressive operations may be used. In an embodiment the compressive operation, or one of the compressive operations for which post filtering and parameter estimation is used may be predictive compression, wherein post-filtering is applied to an image represented by means of references, such as motion vectors, relative to a reference image, or a plurality of reference images.

The selection of the clusters may be performed separately by different parameter estimators. In this case, cluster definition information will be included in the stream for all sets of control parameters. This makes it possible to optimize cluster selection, be it at the expense of increased bandwidth use for the stream. In an alternative embodiment the parameter estimators share the same cluster selection. In this embodiment it suffices to include shared cluster definition information for a plurality of sets of control parameters for successively applied post-filter operations. This reduces bandwidth use.

Figure 10:
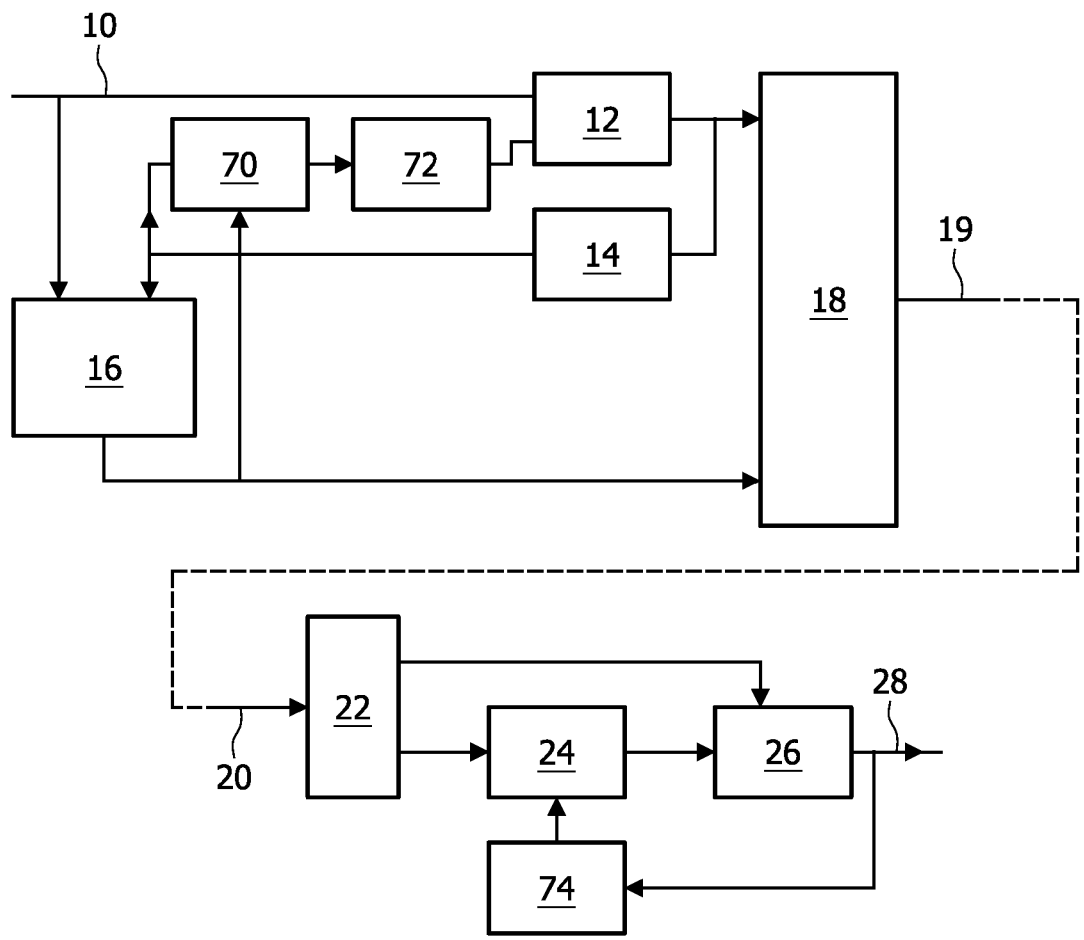
FIG. 10 shows a compression-decompression system.

FIG. 10 shows an application to predictive compression, wherein post-filtering is applied to a reference image. Herein post-filtered decompressed intra-coded images are used as a reference for predictive compression and decompression. The Fig. shows a compression apparatus and a decompression apparatus that each contains a memory 72, 74 for a reference image. The compression apparatus comprises a post-filter 70 coupled between an output of compressor 14 and memory 72. Memory 72 of the compression apparatus is coupled to an input of compressor 12. The output of parameter estimator 16 is coupled to a control input of post-filter 70, whose function is similar to that of the post-filter 26 of the decompression apparatus. In operation memory 72 stores selected images that are obtained by post filtering according to the sets of filter coefficients and compressor 12 uses the stored images to encode other images in terms of motion vectors and optional residue information relative to the stored images.

Similarly, the memory 74 of the decompression apparatus is coupled in a feedback loop from an output of post-filter 26 and an input of decompressor 24. In operation memory 74 stores selected post-filtered images and decompressor 24 uses the stored images to decode other images that are encoded in terms of motion vectors and optional residue information relative to the stored images. In this way improved reference image are provide for use in predictive compression and decompression. In predictive compression and decompression a predicted image may be predicted using only one reference image, but alternatively a prediction from a plurality of reference images may be used.

The method and apparatuses described herein make it possible to reduce compression artefacts by post-processing after at least partial decompression, using post-processing coefficients defined by the compression apparatus. The quality of post-processing is improved by using different sets of coefficients at different positions in the image, selected under control of the content of the decompressed image. Numerous applications linking low and high quality images are possible, e.g. shooting a picture on a mobile phone with a good included camera, but storing it in lower quality+side information, and then sending it to a friend who will see it on his (high definition) television or pc.

One can use different optimal filter sets for different sub-groups of pictures. E.g., B-pictures may need to be filtered differently than I and P pictures. In this case the signal will typically have further information to group the classes and corresponding filtering parameters e.g. (the actual format is left open since the filters can be specified in numerous ways, e.g. an algorithmic description containing procedures to perform on the underlying filtered region) with tags like: B picture: cluster 1: coefficient 1, coefficient 2, . . . ; cluster 2: coefficient 3, coefficient 4, . . . ; clusterX; I picture: cluster Y: . . . .

Other examples of structured clusterings can be done on compression parameters, e.g. different sets for high and low quantization, or high and low motion, etc.

Clustering selection has above been described by various selection criteria among which pixel values, motion vectors and both pixel values and motion vectors. The invention is not restricted to such exemplary selection/classification criteria.

For instance, yet another classification criteria for the adaptive filtering may lead to a significantly reduced computation cost for the decoding process, with an even improved visual quality. It also reduces the computation cost at the encoding and offers more stable performance for the classification. Such filtering is based on the insight that the improvement on the quality of the post-processed sequences mainly concentrate on the areas with gradient changes.

In a preferred embodiment the horizontal gradient value and/or the vertical gradient value are computed and these are used in the selection process. The selector is configured to classify the image information relative to position by classifying on the basis of the horizontal gradient value and/or vertical gradient value.

For example, when deriving the scene-adaptive clusters at the encoder side, instead of using directly the normalized aperture (e.g. 5×5) window as the basic pattern for the clustering statistics, the horizontal gradient value ex and the vertical gradient value ey are calculated by convolving each window with two Sobel edge filters (horizontal and vertical) defined as follows:

| | | |
|---|---|---|
| −1 −2 −1 | and | −1 0 1 |
| 0 0 0 | | −2 0 2 |
| 1 2 1 | | −1 0 1 |

Figure 11:
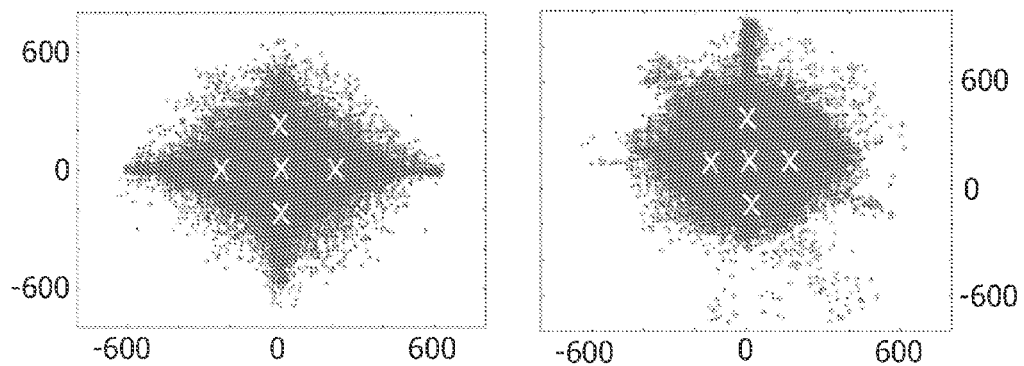
FIG. 11 illustrates an embodiment in which gradients are used as selection criteria.

As a result, each aperture is represented by a feature vector {ex, ey}. The clustering algorithm, e.g. k-means is then performed on these clusters. FIG. 11 shows two typical clustering results for the two sequences. The crosses indicate the cluster centers. The points show the results for a large number of points.

Figure 12:
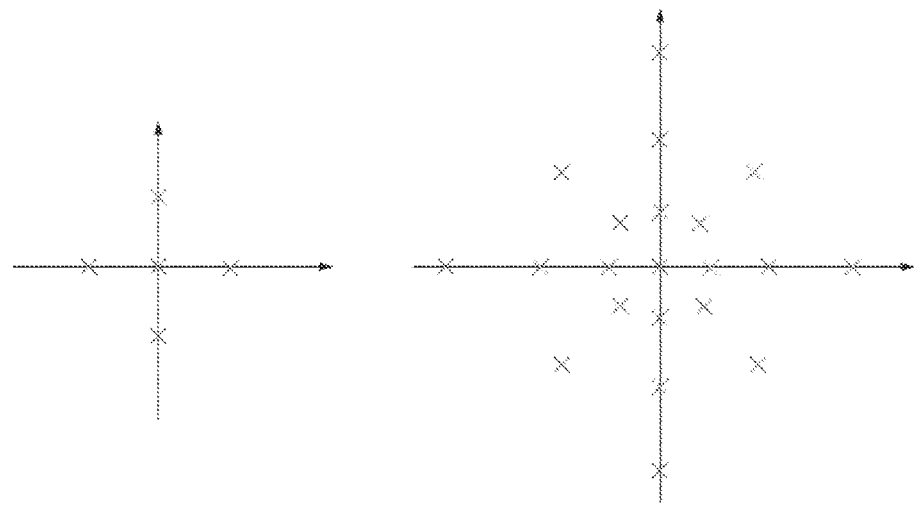
FIG. 12 illustrates the position of cluster centers when gradients are used as selection criteria.

An additional advantage, as has been found, is that the cluster centers are quite consistent for different sequences. Therefore, it is possible to define several cluster profiles independent of the sequences. For example, in FIG. 12, exemplary definitions of 5-cluster-profile and 21-cluster-profiles are shown. The definition of these profiles is obtained by averaging the self-clustering results of a number of sequences. It was found in these two-dimensional plots that the cluster centers derived by k-means for various sequences actually share very similar distributions as depicted in FIG. 12. The crosses indicate the position of the cluster centers. This allows predefining of the cluster centers.

Since the cluster-profiles may be pre-defined and thus standardized, there is no longer a need to transmit the position of the cluster centers along the streams. Therefore, only the scene-adaptive filters (or more in general the control parameter sets) are transmitted as, for instance, side information along the stream. Note that the control parameter sets, such as the parameters of the filters, still need to be dynamically generated for each cluster during the encoding to reflect different characteristics of difference videos (with various scene characteristics, encoding settings, etc).

By applying the above scheme, the savings at the decoder are obvious: the selection of the right clusters is much simplified involving only 2-dimensional feature distances (instead of 5×5=25 dimensional feature distances). Furthermore, in the preferred embodiment using pre-defined cluster profiles, the classification can be implemented e.g. by a pre-defined 2-dimensional look-up table T $$T(ex,ey)=\text{Class-Label},$$

where (ex, ey) are the gradient values at pixel (x,y) and T(ex,ey) directly gives its associated class label for a given profile. Therefore, at the decoder side, the computation cost for the cluster selection is almost negligible.

Another advantage is the more stable classification results. It turns out that the gradient features gives a more visually stable classification of local patterns than the original luminance aperture, leading to visually more appealing post-processed sequences.

When applying the pre-defined gradient-based profiles, the additional bit cost for the side information is reduced by half, since no cluster centre information need to be transmitted. The computation cost at the encoder side is also reduced because no self-clustering is computed and only the MSE optimization is performed.

At the decoder side, the selection of the right filters takes the most of the computation time. Suppose we use N clusters, then the selection of the filter takes N times the computation cost than the filtering itself. By applying a gradient-based scheme, the selection of filters only involves the Sobel convolution and the table look-up for the right cluster. The selection procedure typically takes less than ⅙ computation time of the filtering process. This makes a real-time implementation possible for the post-filtering at the decoder side.

Figure 13:
FIG. 13 illustrates the advantages of using gradients as selection criteria.
Figure 13:

The visual quality by applying a gradient based selection method is even better than pixel value based methods by up to 0.5~0.7 dB. An example is shown in FIG. 13 wherein the cropped examples of a so-called Shields sequence are displayed. The improved visual quality can be explained by the fact that gradient information is a better representation than the raw luminance and the similarity in the X-Y gradient coordinate is more suitable for determining the classes than the MSE metric in the M×M dimensional luminance space.

An alternative or additional simple clustering can also be done on the basis of texture. Texture is often simple to detect with a small number of parameters for instance 1. standard deviation, characterizing how wild the luminance varies
2. running accumulative gradient being one possible measure of how frequently the pattern goes up and down and
3. average color.

Whereas in the gradient type of selection a number of cluster centers in a two dimensional space were defined (see FIGS. 11 and 12) texture clusters may be defined by cluster center points in a three dimensional space, the three axes being for instance standard deviation, running accumulative gradient and average color. One point may correspond for instance to a blue sky (standard deviation small, accumulative gradient small, average color blue. Another point may correspond to grass.

In yet a further embodiment of the method and device in accordance with the invention the selection is performed in a hierarchical structure.

Prior to the actual classification procedure a first rough classification of the most suitable form for selection is made, for instance whether the classification is to take place on luminance values, motion vectors, gradients, texture or any combination of such criteria. Once the first hierarchical decision has been taken, the selection procedure is performed.

The hierarchical decision can be taken for any part of the file, for an image, for a part of an image, a sequence of images. Also, the selection criterion may be dependent on the type of image data, for instance dependent on the type of frame.

Figure 14:
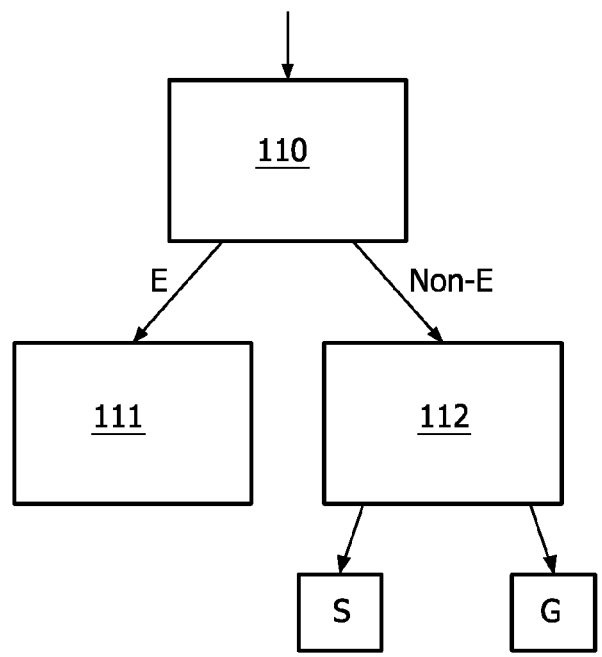
FIG. 14 illustrates a hierarchical structure.

FIG. 14 schematically shows a hierarchical structure in which various possible selection methods are chosen.

The incoming data of an image or part of an image is first in step 110 subjected to an edge filter in pre-selector 110. In this pre-selection a determination is made whether the pattern has primarily an edge character or is primarily texture.

If the analysis shows that the image or part of an image primarily has an edge character the data is transmitted to a final selector 111 wherein a cluster selection and determination of the sets of control parameters for the clusters is performed on the basis of the gradient ex, ey, see FIGS. 11 and 12. If the analysis shows that the pattern is primarily texture the data is transmitted to a final selector 112 wherein a cluster selection and determination of the sets of control parameters for the clusters is performed on the basis of texture parameters.

Figure 15A:
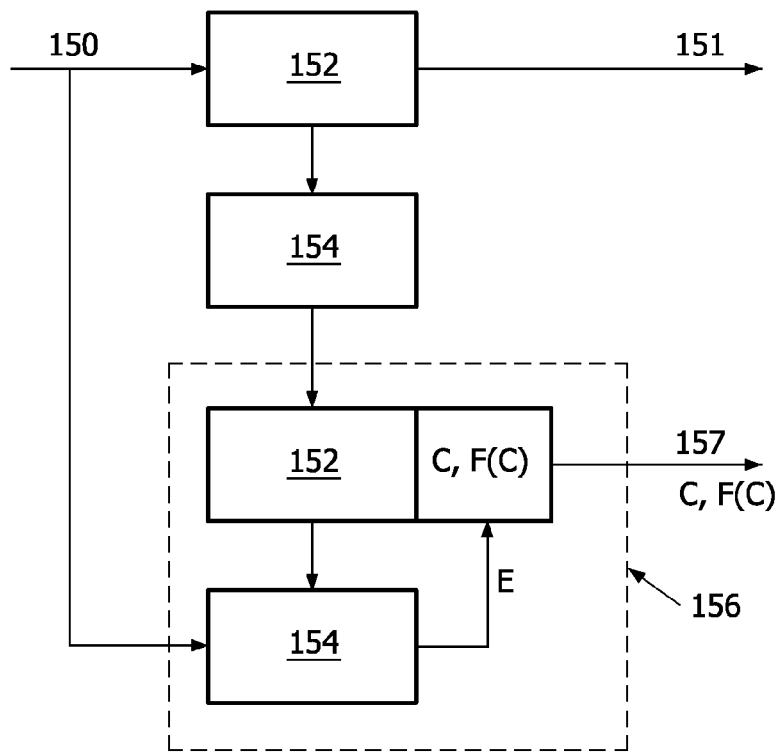
FIGS. 15a, 15b and 15c illustrate a further embodiment using a deblocking function.
Figure 15B:
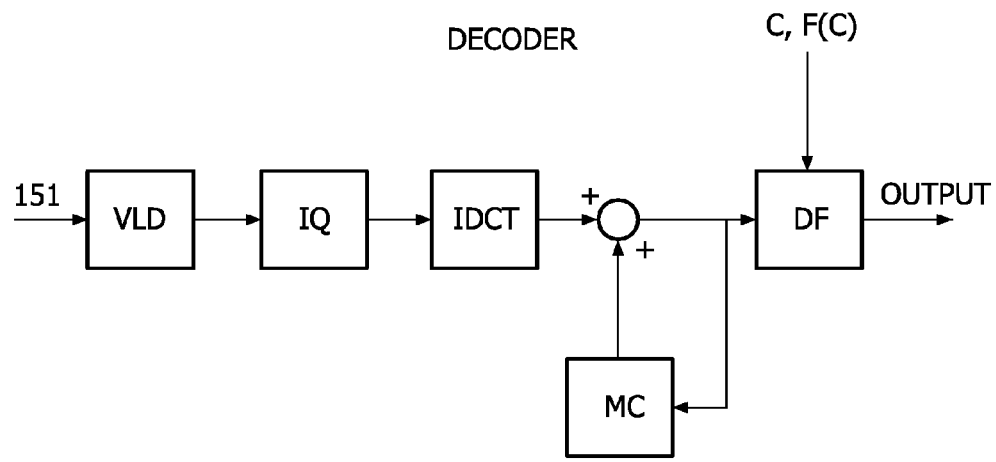
Figure 15C:
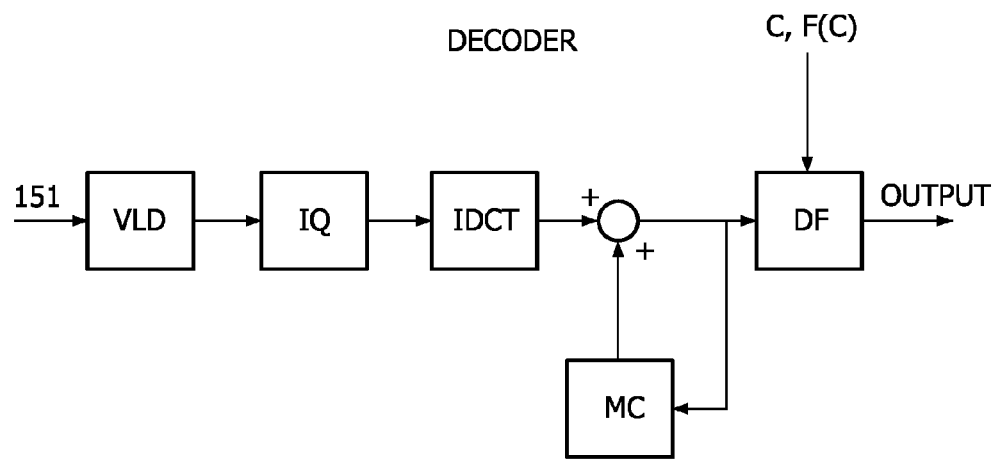

FIGS. 15a to 15c illustrate yet another embodiment of the invention.

In many compression techniques compression is block-based. Upon decompression block edge errors may occur, i.e. the edges of blocks may be visible. The partitioning and block-based processing of the image leads to errors known as blocking artifacts. These blocking artifacts degrade the perceived image quality, especially at low bit-rates. Using a deblocking filter reduces such blocking errors. It is known in the standard H.264 to apply a deblocking filter at the decoder wherein at the decoder end a classification based on edge conditions is made. The classification is used to choose one from a number of possible standard prefixed blocking filters. The different filters themselves are fixed and the selection of the filters at the decoder side can be performed without any side information from the encoder.

FIG. 15a illustrates an embodiment of the invention. At the encoder end an incoming signal 150 is compressed in compressor 152 to provide a compressed signal 151. The compressed signal is decompressed in decompressor 154. After decompression C clusters are formed depending on features such as the position in the block, edge step size and the coding modes of neighboring blocks. For each of the clusters adaptive filters with adaptive filter parameters F(C) are identified dependent on the position within a block and adaptive filters with filter parameters F(C) are used. The output of the deblocking filters is fed to a comparator 154 which compares the compressed-decompressed-filtered image to the original image. The comparator provides an error signal E. The classification (C) and the filter parameters F(C) for the various classes are adapted to minimize the error E. The deblocking filter can be used in-loop and out-of-loop, FIG. 15A shows an example of using the filter out-of-loop, i.e. after complete decompression. The deblocking filter can also be used in-loop.

FIGS. 15b and 15c illustrate the invention at the decoder end.

VLD means variable length decoder, IQ inverse quantization, IDCT inverse DCT, DF deblocking filter and MC stands for motion compensation. The filter operation is governed by the data C (classification) and F(C), i.e. the sets of filter parameters for the different classes. In FIG. 15b the processing circuit is arranged to apply the deblocking filter DF out-of-loop, in FIG. 15c the deblocking filter DF is applied in-loop.

A simple form of this embodiment uses the same criteria of selecting the filters as the known deblocking filter, but replaces the fixed filters by filters with adaptive parameters. In this simple form the known classification determining factors at the decoder end are simply standard, but the filter parameters are adaptive.

Figure 16:
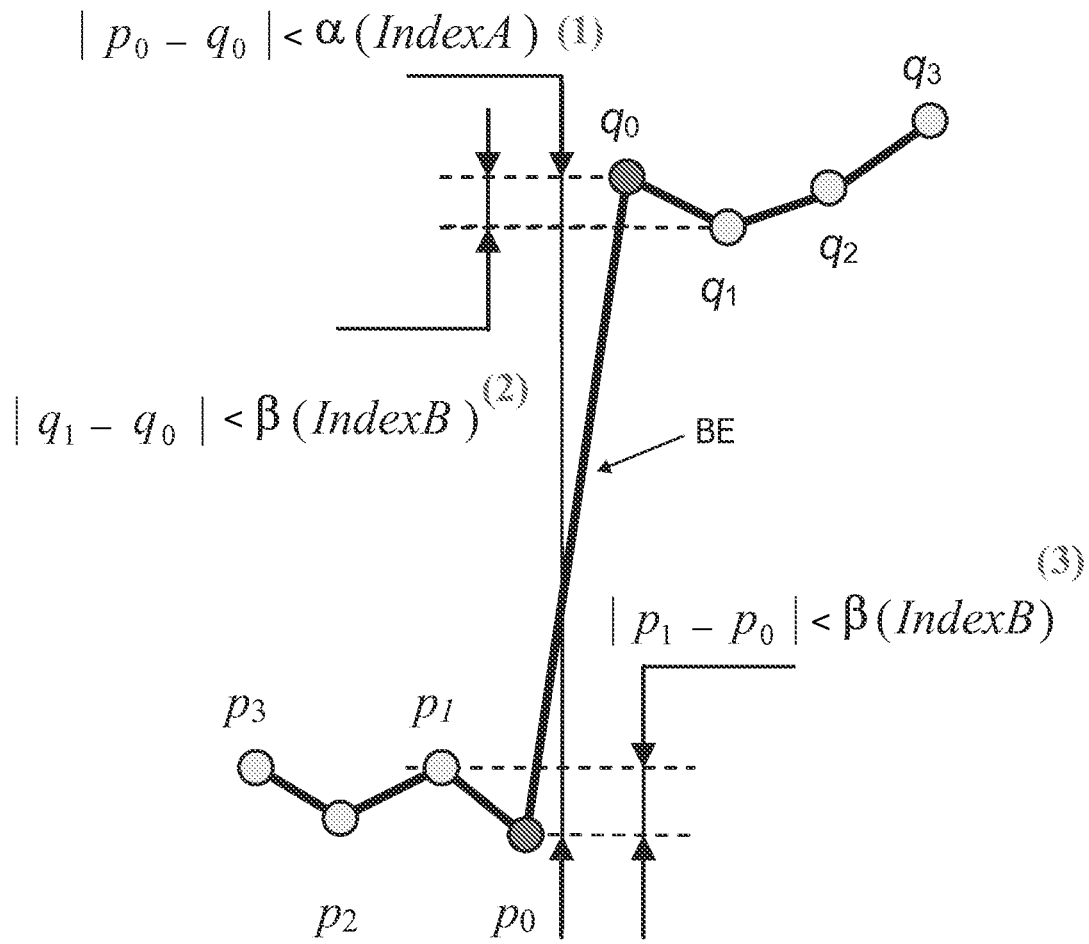
FIG. 16 illustrates an example of the conditions used to decide whether or not the pixels $p_0$ and $q_0$ neighboring a sub-block edge BE.

The selection procedure starts for instance with assigning a boundary strength parameter to the edges of each 4×4 luminance sub-block. The boundary strength is determined exclusively by the mode and coding conditions of each sub-block and its neighboring blocks (e.g. inter or intra, coded residual or not, size of motion vectors) and makes a first selection between strong filtering to edges that are likely to be caused by blocking artifacts, normal filtering to edges that might be effected by blocking and no filtering to edges that are likely to be content related. After this initial subdivision, the edge activity—i.e. inequality conditions on the absolute difference between pixel values on both side of the edge—determine whether or not to apply the filters. FIG. 16 provides an example of the conditions used to decide whether or not the pixels $p_0$ and $q_0$ neighboring the sub-block edge BE are filtered in the normal filtering mode. Pixel $q_0$ is only filtered if conditions (1) & (2) are satisfied. Likewise, $p_0$ is only filtered if (1) & (3) are satisfied. In the known method the set of fixed filters from deblocking filter can select, all have the same structure. They are 1-dimensional filters of the finite impulse response (FIR) type, with maximum 2 taps displacement with respect to the pixel that is filtered. Different fixed filters are applied to pixels with a different distance to the block edge. Pixels that are further from the edge are less likely to be effected by blocking artifacts and will hence receive a weaker filtering. In this way, the deblocking filter accounts in a very rudimental way for the varying in statistics with the relative position in the block-transform. Filtering is conducted in-place at the macro-block level, with first horizontal filtering of the vertical edges, followed by vertical filtering of the horizontal ones.

The procedure of determining which filters to apply can be seen as a classification process and can be performed at the decoder side without the need for any additional information. This has the advantage that no information on the classification needs to be transmitted, and at the decoder end the known classification schemes may be used. The approach of the invention boils down to, instead of using standard fixed filters only at the decoder end, replacing the standard filters with adaptive filters and establishing for each class an optimum set of parameters. The computational demand for classification at the decoder end do not change, which is an advantage.

In a simple embodiment the known determining factors at the decoder end are simply copied, but the filter parameters are adaptive, in more advanced embodiments the determining factors for class selection are also adaptive, for instance by making the conditions 1 & 2 adaptive.

In an embodiment the method is implemented in a two pass procedure. In a first step, the algorithm processes all macroblocks to determine which type of filter is to be applied to each pixel.

In the next pass, all pixels that are affected by a particular filter are collected and the optimal filter coefficients are estimated in a MSE (mean square error) sense. This process is repeated for all filters. However, since the filtering is performed in place, the reference frame preferably is updated in between. This is to say that each time after the coefficients of a filter for a class of pixels are computed the filter is applied to current reference frame before continuing with determining the coefficients for the next filter.

If the scene-adaptive filter is operated in-loop, it is important that the ordering of the filtering process at the encoder and decoder side match. In an embodiment, this is achieved by fixing the order of applying the filters. A simple extension to such implementation is to determine the optimal filtering order at the encoder side and signal the filter order with the stream, the output 157 would then be F(C), i.e. the filter coefficients and S(F), i.e. the order in which the filters are to be applied. Because of the in-place filtering the filtering operation does not commute, and varying the filtering order may improve the performance. To avoid non-linearities as a result of the inloop operation the optimal filter coefficients are estimated frame by frame.

Figure 17:
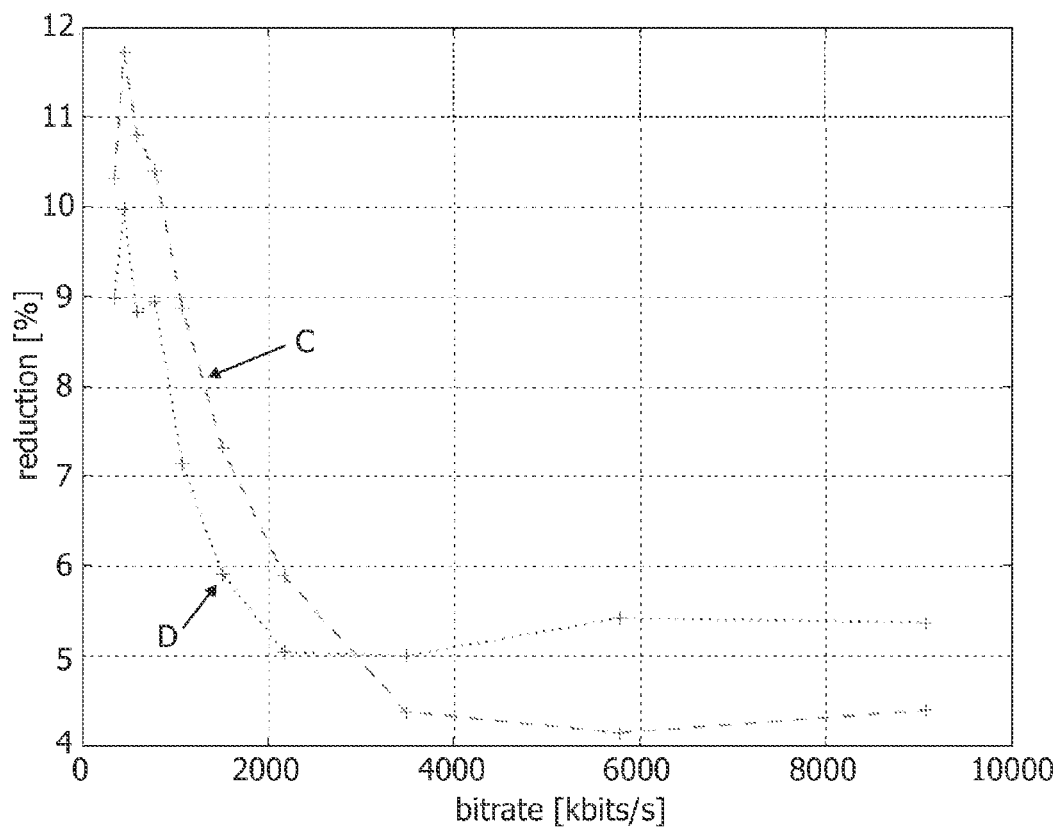
FIG. 17 provides measurements of the reduction in bit-rate.

To avoid non-linearities as a result of the inloop operation the optimal filter coefficients are estimated frame by frame. Compared to the equivalent post-filter, inloop operation this leads to an additional bitrate reduction of 1-1.5%. This can be explained by the fact that the filter does not only improve to final image, but also the reference image offering a higher quality for motion compensation. Another advantage of inloop filtering is that it guarantees a certain level of performance while post-filtering is usually optional. It was found that compared to a deblocking filter algorithm that makes a selection out of a set of pre-defined filters with fixed coefficients, based on both the edge type and the selected coding mode, the performance of deblocking by estimating the optimal coefficients associated with each of these filters and signaling these with the video stream was of the order of 5-10%. FIG. 17 provides measurements of the reduction in bit-rate using adaptive active filters compared to standard H.264 fixed blocking filters using standard classification methods using a classification algorithm proposed by List et al in IEEE transaction on Circuits and Systems for Video Technology 13(7): 614-619. Curves C and D relate to different choices of fixed indexA and indexB, see FIG. 16. The advantage of the invention is clear, using adaptive filter coefficients instead of fixed filters leads to a considerable reduction in bit rate.

As stated above further improvements may be obtained by optimizing the order in which the filter is applied.

Yet further improvements are obtained by adaptive optimization of the classification, e.g. to let the classification of the adaptive active filters be dependent on the relative position in the block-transform. FIG. 17 shows the result for an embodiment in which the classification criteria of the standard fixed deblocking filters have not been optimized for the invention but simple copied. The rather significant effect in reduction of bit-rate suggests that there is still room for improvement by further optimization of the classification and/or filter selection criteria.

The above embodiment of block-based classification is an example of a larger group of embodiments in which the classification and/or filtering is made location dependent, in this case the location within a block.

Within said group of embodiments other examples are:

Do the classification dependent on the position within the image, e.g. near the border a different number of classes and different, simpler set of adaptive filters is used as compared to central regions, in which a larger number of classes is used and/or more complex filters. This could safe on the data having to be transferred.

Make the classification object-dependent, for instance a sky region may use less or less complex filters. In an embodiment the filters are adapted to how central they are in a facial segmented region (e.g. near a shadow region on the boundary of the face). Or within a grass or brick pattern pattern, different filters are applied on the grass blade edges (which may need more sharpening) vs. interiors [and the decoder may be able to re-estimate e.g. brick segment edges from brick interiors] within the entire to be sharpened grass region.

In all embodiments a classification, above also called clustering, is performed on the data, adaptable filters or more in general post-processing processes are generated for each class and the parameters of the filters or more in general the post-processing are, at the encoder side, varied and applied to the corresponding classes of data and optimized to produce, compared to the original image, a low or minimal distortion or, more general an optimum or increase in a quality measure, as of the reduction of (compression) artifacts for the positions in the corresponding one of the classes.

The decoder is given information (either implicitly or explicitly) to regenerate the classification used at the encoder and the parameters for the filters for the clusters or classes are transferred to the decoder and applied in the decoder. As explained numerous paths can be followed for classification, based on different concepts (value, edge, motion, pattern, location as well as combinations of such concepts). Yet another example of a basis for classification is to do the classification dependent on the choice of compression for the local region. Again the decoding side knows such factors like: which quantization was used, what is the motion of the block (and possible prediction errors, or reduced error visibility), etc. and again the filters may be different depending on those parameters (e.g. for high quantization using a filter which is biased/optimized more towards deblocking and less towards sharpening).

Figure 18:
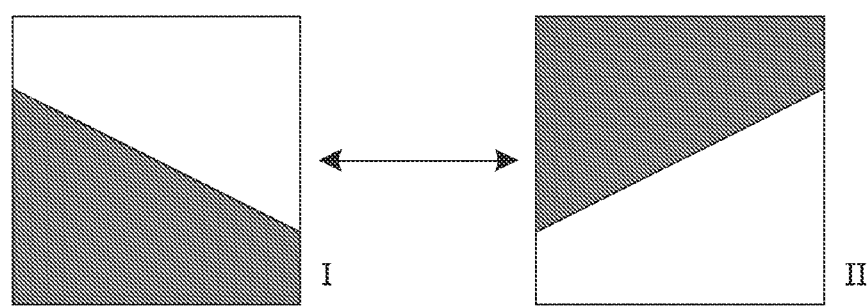
FIG. 18 illustrates a further embodiment.

Yet a further embodiment is illustrated in FIG. 18. FIG. 18 illustrates schematically two windows I and II around a pixel. The window shows certain pattern. Window II can be seen as equivalent to window I having been 'flipped over'. In other words, when comparing the two windows there is a certain type of symmetry between the two windows.

In these embodiments of the invention advantageous use is made of symmetry rules.

In the classification-based post-filtering framework, the classification is often based on a self-clustering strategy wherein pixels are classified using windows around the pixels, such as n×n windows and an average within the window. This is a quite flexible classification method since any number of classes can be pre-specified. However, in many applications, the total number of classes that can be used is limited, due to the bandwidth and/or storage restriction. With limited numbers of classes, it can be very difficult to capture the large variance of local image patterns occurring in one (or more) frames. One way to reduce this large variance is to normalize the windows around pixels with respect to their orientation before the classification and the actual filtering. These windows then form one class and can be post-filtered with the same filter. In this way, the same number of classes can represent a much larger variety of image patterns. In addition to rotation, other types of geometric normalization can be also thought of, such as shifting and mirroring.

Figure 19:
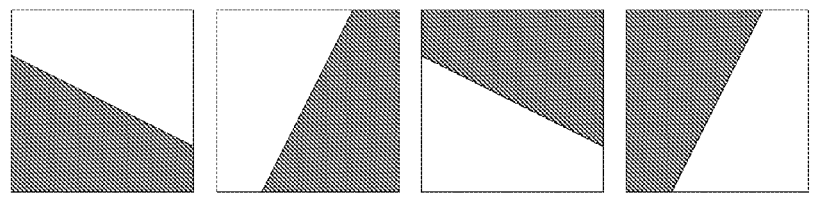
FIG. 19 illustrates patterns that show rotational symmetry.

FIG. 19 provides a number of patterns that are in fact equivalent but for a rotating of 90, 180 or 270 degrees.

Figure 20:
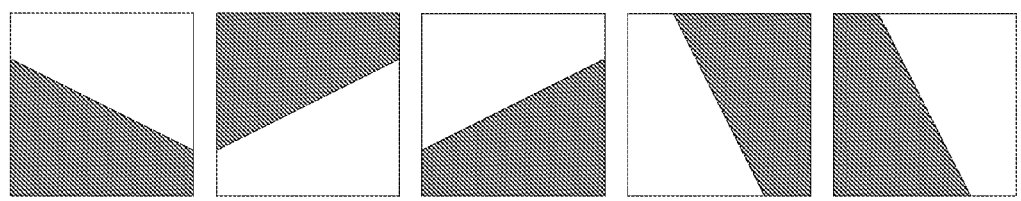
FIG. 20 illustrates patterns that show symmetry by shifting.
Figure 21:
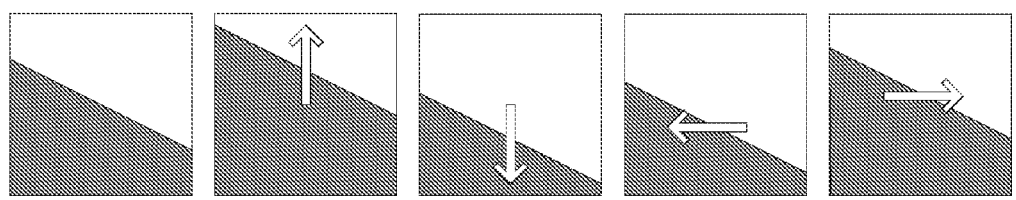
FIG. 21 illustrates patterns that show symmetry by flipping.

FIG. 20 shows the same or similar patterns that are flipped versions of each other, FIG. 21 shows patterns that are shifted versions of each other. The insight on which this embodiment is based is that the various symmetries are used to reduce this large variance is by normalizing the windows with respect to their orientation before the classification and the actual filtering. These windows then form one class and can be post-filtered with the same filter. In this way, the same number of classes can represent a much larger variety of image patterns. In addition to rotation, as in FIG. 19 other types of geometric normalization can be also thought of, such as shifting (FIG. 21) and mirroring (FIG. 20).

In such embodiment the parameter estimator is arranged to perform a symmetry operation on the classification.

In the following, we give an example to illustrate how we can generate geometry-invariant classification to result in fewer classes. The description is in the context of the clustering as described above using n×n windows around pixels and classification on minimizing the sum of the squares. However, it can be readily understood a similar line of reasoning can be applied for other types of classification methods as well.

An example procedure is as follows:

Step 1: Collect windows samples from the compressed frames.

Step 2: For each window sample x, derive its transformed versions xi corresponding to 3 rotational patterns, 4 mirroring patterns and shifted patterns (a is the aperture size). Suppose the aperture size a=5, this would mean that altogether N=3+4+8=15 additional transformed patterns have to be generated.

Step 3: Extend the distance metric used in the clustering algorithm. If the distance between a given sample x and the cluster centre y is to be calculated, we calculate the distance between each transformed version of sample x and y and then select the minimum distance.

Step 4: As a result of the modified K-means algorithm as described above, we obtain a number of cluster (class) centers that are optimal (in the MSE sense) with respect to geometry-invariant patterns. During the filter generation, however, the transformed version of each sample x that results in the minimum distance to the cluster centre will be used to optimize the filter coefficients.

The derived cluster (class) centers and the corresponding filter coefficients will be transmitted to the decoder side for post-processing. At the decoder side, for each pixel position, besides using the basic feature vector for classification, a number of variants have to be generated (as in Step 2), each of which has to be compared to the cluster (class) centers in order to derive the smallest distance among all variants and cluster centers. The corresponding filter coefficients are then selected and applied to the transformed variant selected. Note that the filtered results need to be transformed back to be applied to the decoded frame.

Although the above example is based on the example of using minimizing distances, it can be also easily extended to e.g. gradient-based classification strategy such as schematically illustrated in FIGS. 11 and 12. In this case, after Step 2, for each candidate transformed pattern, the corresponding gradient-based feature vector has to be calculated and used for the clustering thereafter.

Note that the proposed method can be also applied to the in-loop filtering.

Experimental results were found.

The above described embodiment was implemented within H.264 reference software and experimentation with SD-resolution sequences, with quantization parameter QP set from 28 to 34. The geometry-invariant filtering was implemented as an additional feature option to the in-loop post-filtering. We measured the PSNR gain for each frame and for most frames, a gain of 0.03 dB to 0.06 dB is observed as compared to not using geometry invariance (with the same number of classes). For some frames up to 0.1 dB gain is achieved. Since adding geometry-invariance requires no additional bit rate increase, geometry invariance provides an additional enhancement to the existing in-loop filtering, without set-backs.

We also noticed in our experiments that for some frames enabling the geometry-invariant filtering option may provide a negative effect with respect to PSNR. This could be a result of the lack of pattern variety in the frame, and using geometry invariance might not positively contribute to the quality. However, since the classification and the in-loop filtering are performed at the encoder side, the encoder can decide to disable the use of geometry invariance for the current frame if such negative gain occurs. This means that an additional one 'signal bit' has to be sent for each frame to indicate whether geometry invariance is used or not. As compared to the total bit rate, this is clearly a negligible overhead, while the average gain increases.

2. Switching on all transform modes (e.g. 3 rotation modes, 4 mirroring modes and a number of shifting modes) may not give the optimal performance with respect to PSNR. For example, for sequence Helicopter, we have found on average using 2 mirroring modes (vertical and horizontal flipping) and shifting modes would give the best performance. However, it could be a sequence-dependent decision to switch on certain modes while disabling the others. Such fine-tuning is equivalent to using geometry invariance or not.

Symmetry invariance transformation (flipping, shifting, rotating) are a subclass of a large class of pattern invariance transformations.

Another simple pattern invariance operation is scaling.

Figure 22A:
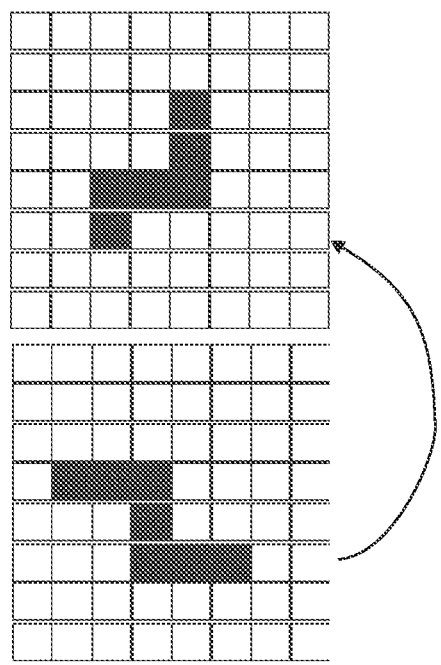
FIGS. 22a to 22c illustrate examples of patterns showing invariance under transformations.
Figure 22B:
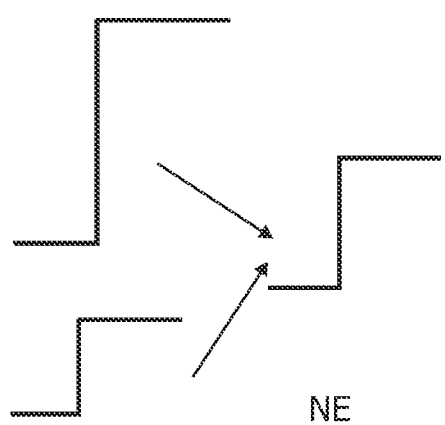
Figure 22C:
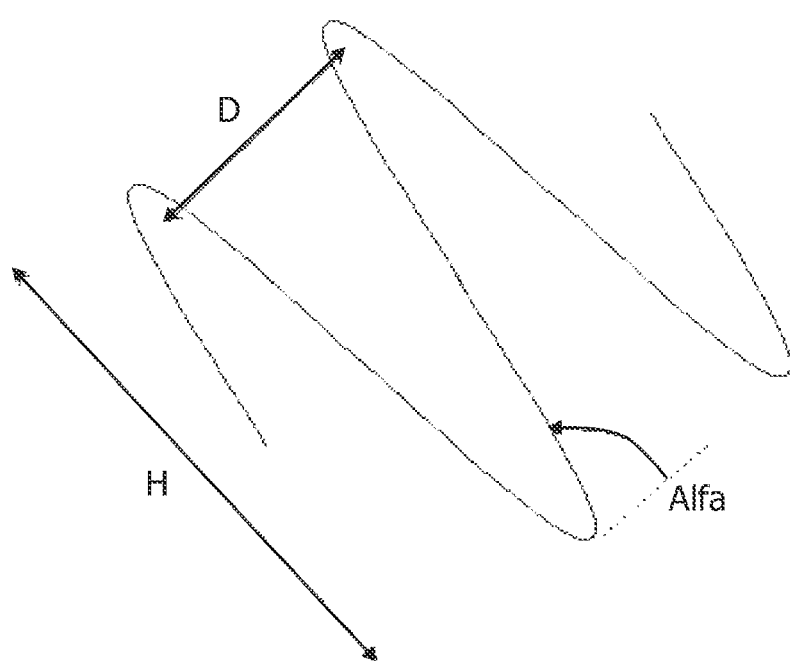

Other examples of patterns showing certain invariance under transformations are illustrated in FIGS. 22a to 22c:

Example A not exact but similar worm-like structures: the transformation of a "not exact rotation" can be done e.g. like this: classify the pixels in a block into dark and bright [e.g. above block average], and use a "chain orientation code" to test similarity: E.g.: If the directional change is in the same compass direction and the, length differs not more than 1 pixel for each oriented run of pixels (e.g. 2 vs. 3 pixel starting segment), the pattern may be considered similarly, and treated with a similar filter (e.g. certain blur Kernel size).

Example B

One could also normalize the (grey value) height of an edge (although in some filter cases [e.g. filter implements an edge strength change] it may be wiser to adapt the filter also to the height of the edge, but in those cases one could e.g. classify the edge step height in a number of subclasses (strong, medium, minor edge).

Example C gives another example which can be used e.g. to process (pseudo) periodic textures (e.g. with a nonlinear function which leaves their grey value top parts but deepens their valleys [could e.g. deepen the dark regions between blades of grass]).

The pattern is exemplary modeled [this could be fitted to the underlying data] as a sinusoidal grating, of certain height h [the brightest pixel grey/luminance/color value—e.g. 240-minus the darkest—e.g. 10-], a slope alfa (which results in an intertop distance D), and it has a certain spatial orientation beta in a block (symbolically shown here 45 degs., but that cannot be shown simultaneously on a grey value cross-section graph, because that has only one spatial dimension).

All patterns with values alfa, h, D which do not differ too much could then be classified in the same texture class, or again some subclasses could be made along the possible range of values [linearly, or non-linearly], and then parameterized filters could be trained f(h, alfa); this can be done e.g. by checking how the filter coefficients vary over the different (h, alfa) range classes, and modeling them with polynomials.

Figure 23:
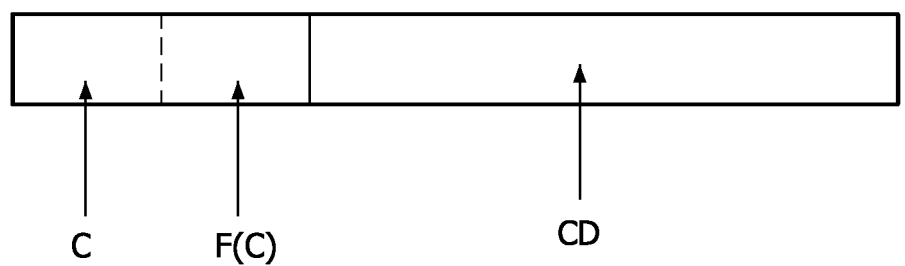
FIG. 23 schematically illustrates a signal.

FIG. 23 illustrates schematically an image defining signal according to the invention. The image defining signal comprises image information, CD in this example Compressed Data, that defines a content of an image;

a plurality of control parameter sets defining control parameters of an image processing circuit for post processing said content at respective positions in the image, in this example Class defining parameters C and sets of parameters for each class F(C), such as for instance sets of filter coefficients.

The class defining parameters can have a variety of forms dependent on the path chosen to define a class. The class defining parameters may define the manner in which classes are defined (by value, edge, pattern, block based, motion vector etc) or may have parameters directly defining cluster centers (see FIG. 12). In some embodiments the class defining parameters may not be present, for instance if a fixed manner for defining classes at encoder and decoder is used.

The sets of parameters for each set may be filter coefficients. The parameter sets may be defined in an absolute manner, for instance the exact value of each parameter, or in a relative manner, for instance the change in parameters within a set of parameters compared to a previous value.

Within embodiments the image defining signal may comprise information on various separate operations each having separate classification and sets of parameters for classes. For instance, an in-loop deblocking operation may be followed by a further processing based on gradients based clustering in the image after the decoding loop. For each of the two mentioned process steps information on the classification and sets of coefficients for the various classes may be present in the image defining signal. Each of the classifications is based on a different principle and the coefficients will also differ, so the information will differ.

The class defining data and the sets of parameters may be provided in any suitable manner, e.g. as a header, by flags or as a separate signal.

The invention is set forth in the claims. As used herein the term "comprising" does not exclude other elements or steps, that "a" or "an" does not exclude a plurality, and that a single processor or other unit may fulfill the functions of several means recited in the claims. When the term "circuit" is used this encompasses programmable circuits programmed to perform the function of the circuit. Reference signs in the claims shall not be construed as limiting the scope.

In short the invention can be described as follows:

Clusters of pixels are defined for use in image compression and decompression. The image information used to define the clusters may include pixel values at predetermined positions relative to a pixel or related motion vectors, gradients, texture etc. During compression of images the image information relative to pixels is examined to determine the cluster to which it belongs. Thus pixels can be classified according to the cluster for their image information. In an embodiment the definitions of the clusters are selected dynamically, dependent on image content. For each cluster a control parameter set is computed for a post-processing operation, such as filter coefficients for filtering or statistical data for locally generating texture. The control parameter set is selected dependent on the image content so that, when the post-processing operation is applied to the image after decompression it will improve image quality for the pixels that are classified as belonging to the cluster. The compressed image and the control parameter sets are transmitted to a decompression apparatus. Upon decompression, the image information that represents the decompressed image is examined to classify pixels according to the clusters and the different control parameter sets for the selected clusters are used to control post-processing at the locations of the pixels.

The invention claimed is:

1. A decompression apparatus comprising:
    an input or inputs for receiving at least partially compressed image information and a plurality of control parameter sets, the at least partially compressed image information defining a content of an image;
    a memory for storing the received plurality of the control parameter sets, wherein each control parameter set comprises a unique set of filter coefficients and for storing representative combinations of pixel values;
    a decompressor configured to at least partially decompress the image information to output a plurality of combinations of pixel values associated with particular pixels in the image, wherein the pixel values can be one of, luminance values, motion vector values, gradient values, texture values and combination thereof;
    a selector configured to classify each of the plurality of combination of pixel values output from the decompressor by comparing the representative combination of pixel values from the stored memory with each of the outputs of the decompressor to select one of the representative combination of pixel values for each output of the decompressor which minimizes a distance measure between the combination of pixel values and the representative combination of pixel values;
    the selector for selecting a respective one of the received plurality of control parameter sets for each of said combination of pixel values output from the decompressor dependent upon the selected representative combination of pixel values from the stored memory;
    an image processing circuit configured to post-process the at least partially decompressed image information, using the selected respective ones of the control parameters sets to control post-processing for pixels in the image.

2. A decompression apparatus according to claim 1, comprising a demultiplexer configured to demultiplex the image information and the control parameter sets from an input signal.

3. A decompression apparatus according to claim 2, wherein the demultiplexer is configured to demultiplex image information defining a sequence of images from the input signal, and wherein the selector is configured to select from the same plurality control parameter sets using the same classification parameters for each of a plurality of the images in the sequence.

4. A decompression apparatus according to claim 1, wherein the image processing circuit comprises a filter, the control parameter sets comprising filter coefficients for use by said filter.

5. A decompression apparatus according to claim 4, wherein the said filter is a deblocking filter.

6. A decompression apparatus according to claim 5, wherein the processing circuit is arranged to apply the deblocking filter in-loop.

7. A decompression apparatus according to claim 4, wherein decompressor comprises an inverse resolution scaler the image processing circuit being configured to perform resolution upscaling filtering using filter coefficients defined by the control parameter sets.

8. A decompression apparatus according to claim 4, wherein the filter comprises a series arrangement of sub-filters, the control parameter sets comprising filter coefficients the respective sub-filters.

9. A decompression apparatus according to claim 1, wherein the image processing circuit comprises a random or pseudo random signal generator, configured to generate random or pseudo signals with statistical properties defined by the control parameter sets.

10. A decompression apparatus according to claim 1, comprising a reference memory for storing a reference image for use in decompression of a predictively compressed image, the reference memory having an input coupled to an output of the image processor for storing a post-processed image for use as the reference image.

11. A decompression apparatus according to claim 2, wherein the demultiplexer is configured to demultiplex class defining data from the input signal, the selector being configured to classify the content into classes defined by the class defining data.

12. A decompression apparatus according to claim 1, the selector being configured to classify the plurality of pixels in the image by classifying a vector comprising pixel values in the image at predetermined relative locations with respect to the respective pixel, and to select a respective one of the received plurality control parameter sets dependent on the classifications for the vector.

13. A decompression apparatus according to claim 1, the selector being configured to classify the plurality of pixels in the image by classifying a vector comprising motion vectors characterizing motion between the image and a neighboring image in the video stream in regions in the image at predetermined relative locations with respect to the respective pixel, to select a respective one of the received plurality of control parameter sets dependent on the classifications for the vector.

14. A decompression apparatus according to claim 1, wherein the selector is configured to classify the plurality of pixels in the image by classifying the texture content of the image in a respective window relative to the pixel, and to select a respective one of the received plurality of control parameter sets dependent on the classifications for the texture.

15. A decompression apparatus according to claim 1, wherein the selector is configured to classify the plurality of pixels in the image, by classifying on the basis of the horizontal gradient value and/or vertical gradient value and to select a respective one of the received plurality of control parameter sets dependent on the classifications of the horizontal and/or vertical gradient.

16. A decompression apparatus according to claim 1, wherein the compressed image information is block based and the selector is configured to classify the plurality of pixel positions in the image, by classifying relative to position within a block and edge activity and to select a respective one of the received plurality of control parameter sets dependent on the classifications of the position within a block and edge activity.

17. A compression apparatus comprising:
- an image input for receiving an input signal that defines an input image;
- an image signal compressor with a compressor input coupled to the image input and a compressor output for at least partially compressing the image;
- a parameter estimator, with an input coupled to the image input and configured to classify pixels in the image into respective classes, on the basis of content of the image in a respective window relative to the pixel in the respective window by comparing the combination of pixel values in a respective window with representative combinations of pixel values of the respective classes, wherein the pixel values can be one of, luminance values, motion vector values, gradient values, texture values and combinations thereof, and to compute a plurality of control parameter sets, each comprising a unique set of filter coefficients, each for a corresponding one of the respective classes, based on a comparison of the compressed image and the input image, defining a post processing operation for reducing compression artifacts for the pixels in the corresponding one of the classes by selecting a respective one of the computed plurality of control parameter sets that minimizes a distance measure between the combination of pixel values in a respective window and the representative combination of pixel values of the respective classes.

18. A compression apparatus according to claim 17, comprising a multiplexer configured to multiplex the control parameter sets and a compressed image signal from the compressor output into a multiplexed output signal.

19. A compression apparatus according to claim 17, wherein the parameter estimator is configured to select definitions of the classes dependent on a content of the input image.

20. A compression apparatus according to claim 17, wherein the definitions of the classes comprise cluster vectors comprising decompressed image content at configurations of relative pixel locations.

21. A compression apparatus according to claim 17, wherein the definitions of the classes comprise cluster vectors comprising motion vectors for configurations of relative pixel locations.

22. A compression apparatus according to claim 17, wherein the definitions of the classes comprise horizontal gradient value and/or vertical gradient value for configurations of relative pixel locations.

23. A compression apparatus according to claim 17, wherein the definitions of the classes comprise the location within a block and the edge activity and the parameter sets are deblocking filter parameter sets.

24. A compression apparatus according to claim 17, wherein the parameter estimator is arranged to perform a symmetry operations on the classification.

25. A compression apparatus according to claim 17, configured to compress a video sequence comprising the input image and wherein the parameter estimator is configured to compute the plurality of control parameter sets in common for a plurality of input images from the video sequence.

26. A compression apparatus according to claim 17, comprising a decompressor configured to receive the compressed image signal from the compressor output, the parameter estimator having a further input coupled to the decompressor for receiving a decompressed image signal, the parameter estimator being configured to select the parameter sets dependent on a difference between the input image and a decompressed image defined by the decompressed image signal.

27. A compression apparatus according to claim 26, wherein the parameter estimator is configured to select a classification control parameter for each pixel that, when the post-processing is applied to a decompressed image from the image signal decompressor at the pixels in the corresponding one of the classes as defined by the control parameter, reduces the difference between the input image and the decompressed image averaged over the pixels in the corresponding one of the classes.

28. A compression apparatus according to claim 17, wherein the compression performed by the compressor comprises quantization.

29. A compression apparatus according to claim 17, wherein the compression performed by the compressor comprises resolution downscaling.

30. A compression apparatus according to claim 17, wherein the parameter estimator is configured to estimate sets of filter coefficients that, when used in a filter for filtering of a decompressed image at the pixels in the corresponding one of the classes as defined by the control parameter, reduces the difference between the input image and the decompressed image averaged over the pixels in the corresponding one of the classes.

31. A compression apparatus according to claim 30, wherein the sets of filter coefficients are deblocking filter coefficients.

32. A compression apparatus according to claim 17, wherein the filter comprises a series arrangement of a plurality of sub-filters, sets of filter coefficients comprising filter coefficients for each of the sub-filters.

33. A compression apparatus according to claim 32, wherein the parameter estimator is configured to estimate a set of the filter coefficients for at least one of the sub-filters in common for a plurality of the classes.

34. A compression apparatus according to claim 17, wherein the parameter estimator is configured to estimate a statistical property indicating a spread of differences between the compressed signal and the input image within the class, and to represent the statistical property in the sets of control parameters.

35. A compression apparatus according to claim 17, comprising a reference memory for storing a reference image, the compressor being configured to represent a further image by means of references to the reference image, the reference memory having an input coupled to an output of the image processor for storing a post-processed image for use as the reference image.

36. A method of decompressing an image, the method comprising:
- receiving compressed image information and control parameter sets, the compressed image information defining a content of an image;
- storing, in a memory, a plurality of the control parameter sets, wherein each control parameter set comprises a unique set of filter coefficients;
- storing in said memory, a plurality of representative combinations of pixel values;
- at least partially decompressing the image information using a decompressor to output a plurality of combination of pixel values associated with particular pixels in the image, wherein the pixel values can be one of, luminance values, motion vector values, gradient values, texture values and combination thereof;

classifying each of the plurality of combination of pixel values output from the decompressor by comparing the representative combination of pixel values form the stored memory with each of the outputs of the decompressor to select one of the representative combination of pixel values for each output from the stored memory which minimizes a distance measure between the combination of pixel values and the representative combination of pixel values;

selecting a respective one of the plurality control parameter sets from the stored memory dependent on the selected representative combination of pixel values from the stored memory; and post-processing the at least partially decompressed image information, using the selected respective ones of the received control parameters sets for said pixels in the image from the memory to control post-processing for said pixels in the image.

37. A non-transitory computer readable medium, comprising a program in instructions that, when executed by a programmable computer, cause the programmable computer to execute the method according to claim 36.

38. A method of compressing an image, the method comprising:

receiving an input signal that defines an input image;
compressing the input signal;
    collect window samples from compressed frames of the compressed input signal;
    classifying each window sample in the image into respective classes, on the basis of content of the image in a respective window relative to the pixels in the respective window by comparing the combination of pixel values in a respective window with representative combinations of pixel values of the respective classes, wherein the pixel values can be one of, luminance values, motion vector values, gradient values, texture values and combinations thereof,
    compute a plurality of control parameter sets each comprising a unique set of filter coefficients, each for a corresponding one of the respective classes, defining a post processing operation for reducing compression artifacts for the pixels in the corresponding one of the classes by selecting a respective one of the computed plurality of control parameter sets that minimizes a distance measure between the combination of pixel values in a respective window and the representative combination of pixel values of the respective classes.

39. A non-transitory computer readable medium, comprising a program in instructions that, when executed by a programmable computer, cause the programmable computer to execute the method according to claim 38.

* * * * *